(12) United States Patent
Schlanger

(10) Patent No.: US 11,001,333 B2
(45) Date of Patent: May 11, 2021

(54) VEHICLE WHEEL AXLE ASSEMBLY

(71) Applicant: Raphael Schlanger, Wilton, CT (US)

(72) Inventor: Raphael Schlanger, Wilton, CT (US)

(*) Notice: Subject to any disclaimer, the term of this patent is extended or adjusted under 35 U.S.C. 154(b) by 188 days.

(21) Appl. No.: 16/377,167

(22) Filed: Apr. 6, 2019

(65) Prior Publication Data

US 2019/0233045 A1 Aug. 1, 2019

Related U.S. Application Data

(63) Continuation of application No. 15/681,410, filed on Aug. 20, 2017, now Pat. No. 10,676,149, which is a continuation-in-part of application No. 14/974,228, filed on Dec. 18, 2015, now abandoned, and a continuation-in-part of application No. 14/974,451, filed on Dec. 18, 2015, now Pat. No. 9,758,209, which is a continuation-in-part of application No. 14/958,263, filed on Dec. 3, 2015, now Pat. No. 10,112,439, which is a continuation-in-part of application No. 14/952,645, filed on Nov. 25, 2015, now Pat. No. 9,815,329, which is a continuation-in-part of application No. 14/602,543, filed on Jan. 22, 2015, now Pat. No. 9,561,833, which is a continuation-in-part of application No. 13/914,490, filed on Jun. 10, 2013, now Pat. No. 9,446,626, which is a continuation-in-part of application No. 12/655,433, filed on Dec. 30, 2009, now Pat. No. 8,485,335.

(Continued)

(51) Int. Cl.
*B62K 25/02* (2006.01)
*B60B 27/02* (2006.01)

(52) U.S. Cl.
CPC ............ *B62K 25/02* (2013.01); *B60B 27/026* (2013.01); *B60B 2900/113* (2013.01); *B60B 2900/541* (2013.01); *B62K 2206/00* (2013.01)

(58) Field of Classification Search
CPC ..... B60B 27/023; B60B 27/026; B62K 25/02; B62K 2206/00
See application file for complete search history.

(56) References Cited

U.S. PATENT DOCUMENTS 6,089,675 A * 7/2000 Schlanger ............. B60B 27/023
280/279
6,409,281 B1 * 6/2002 Kanehisa ............. B60B 27/026
301/110.5

(Continued)

*Primary Examiner* — Kip T Kotter

(57) ABSTRACT

An axle assembly, including: an axle sleeve with first and second end faces, an opening, and a first engagement surface; a control shaft with an engagement end, a control end, and a second engagement surface. The control shaft overlaps the opening and is axially displaceable in extending and retracting directions. The control shaft is rotatable relative to the axle sleeve between: (i) a first orientation where the control shaft is retained to the axle sleeve by an overlie engagement between the first and second engagement surfaces to restrict the axial displacement of the control shaft in the retracting direction at a first axial position; and (ii) a second orientation circumferentially offset from the first orientation such that the first and second engagement surfaces are not overlying and the control shaft may be axially displaced in the retracting direction relative to the first axial position.

21 Claims, 17 Drawing Sheets

Related U.S. Application Data

(60) Provisional application No. 62/653,575, filed on Apr. 6, 2018, provisional application No. 62/381,155, filed on Aug. 30, 2016, provisional application No. 62/124,391, filed on Dec. 18, 2014, provisional application No. 61/965,201, filed on Jan. 27, 2014, provisional application No. 61/204,130, filed on Jan. 2, 2009.

(56) References Cited

U.S. PATENT DOCUMENTS

| | | | | |
|---|---|---|---|---|
| 2008/0197601 A1* | 8/2008 | Kanehisa | ............... | B62K 21/02 280/279 |
| 2008/0197602 A1* | 8/2008 | Watarai | ................. | B62K 25/02 280/281.1 |
| 2008/0197604 A1* | 8/2008 | Hara | ..................... | B62K 25/02 280/288.4 |
| 2008/0315678 A1* | 12/2008 | Watarai | ................ | B60B 35/004 301/110.5 |
| 2009/0115241 A1* | 5/2009 | Kanehisa | ............... | B62K 25/02 301/124.2 |

* cited by examiner

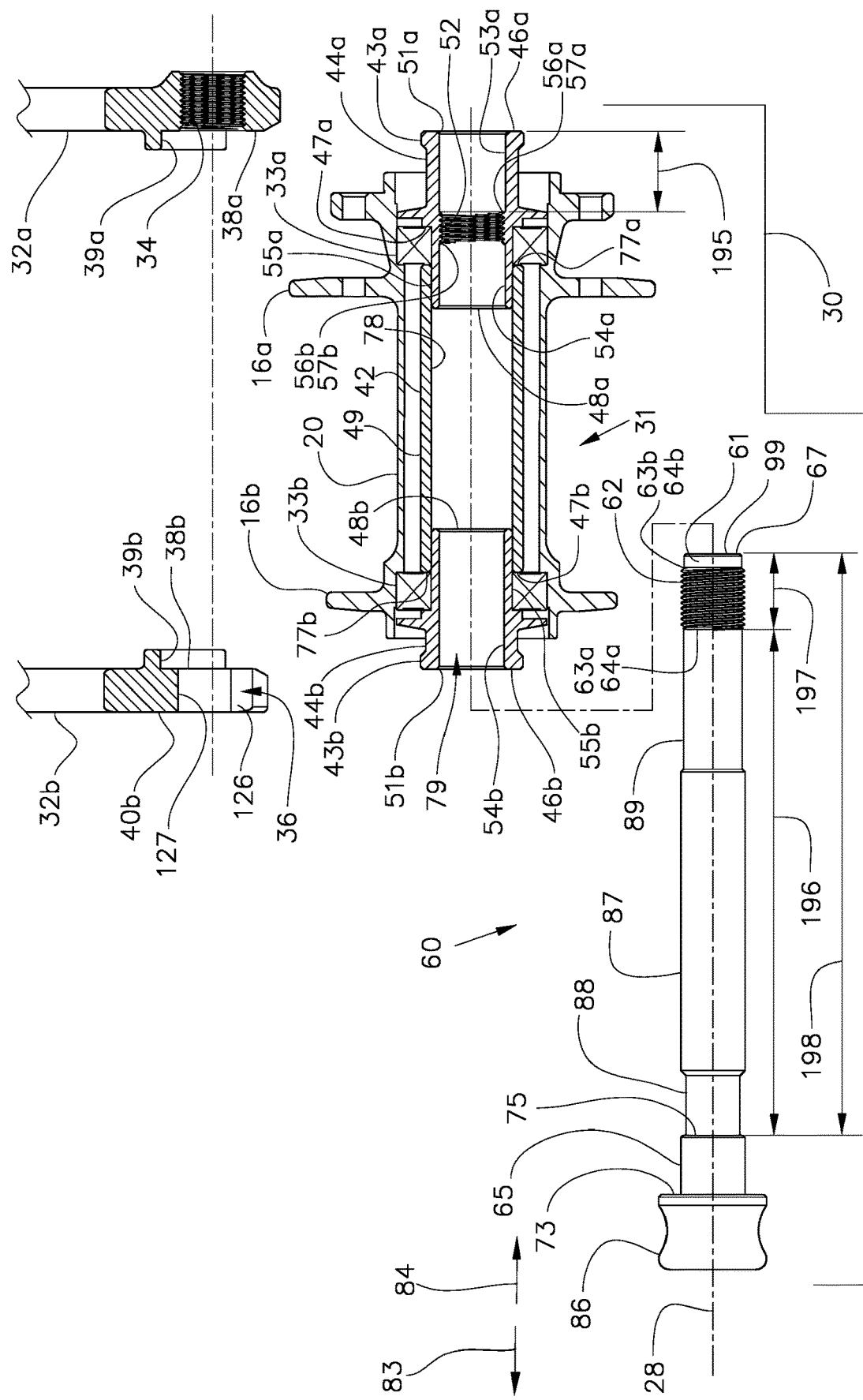

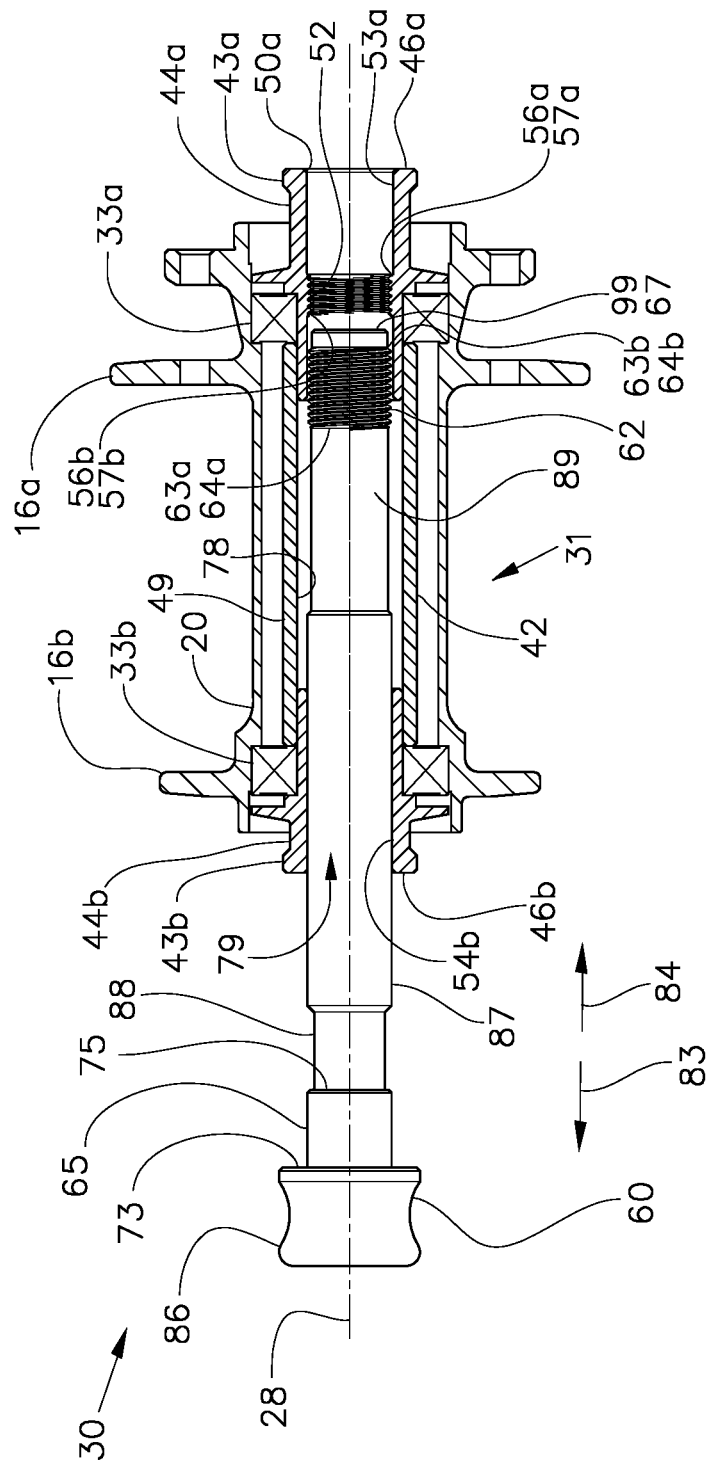

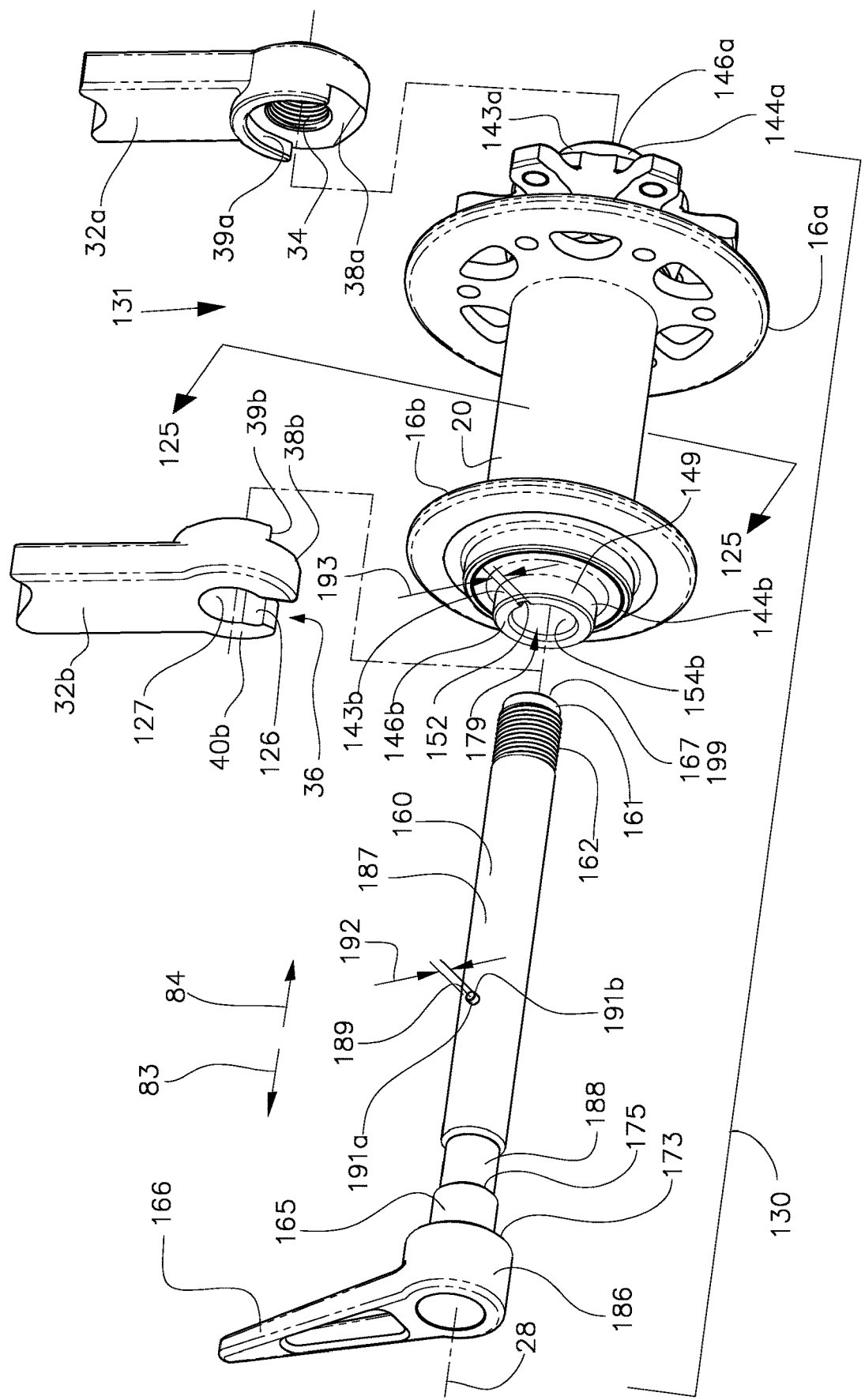

VEHICLE WHEEL AXLE ASSEMBLY

CROSS-REFERENCE TO RELATED APPLICATION

This application claims priority of U.S. Provisional Patent Application 62/653,575, filed Apr. 6, 2018 and entitled "VEHICLE WHEEL AXLE ASSEMBLY".

This application is a Continuation-In-Part of U.S. patent application Ser. No. 15/681,410, filed Aug. 20, 2017, which is currently pending.

U.S. patent application Ser. No. 15/681,410 claims priority of U.S. Provisional Patent Application 62/381,155, filed Aug. 30, 2016, which has expired.

U.S. patent application Ser. No. 15/681,410 is also a Continuation-In-Part of U.S. patent application Ser. No. 14/974,228, filed Dec. 18, 2015, which is abandoned.

U.S. patent application Ser. No. 15/681,410 is also a Continuation-In-Part of U.S. patent application Ser. No. 14/974,451, filed Dec. 18, 2015, which was issued as U.S. Pat. No. 9,758,209 on Sep. 12, 2017.

U.S. patent application Ser. No. 14/974,451 claimed priority of U.S. Provisional Patent Application 62/124,391, filed Dec. 18, 2014, which has since expired.

U.S. patent application Ser. No. 14/974,451 is also a Continuation-In-Part of U.S. patent application Ser. No. 14/958,263 filed Dec. 3, 2015, which was issued as U.S. Pat. No. 10,112,439 on Oct. 30, 2018.

U.S. patent application Ser. No. 14/958,263 is a Continuation-In-Part of U.S. patent application Ser. No. 14/952,645 filed Nov. 25, 2015, which was issued as U.S. Pat. No. 9,815,329 on Nov. 14, 2017.

U.S. patent application Ser. No. 14/952,645 is a Continuation-In-Part of U.S. patent application Ser. No. 14/602,543 filed Jan. 22, 2015, which is which was issued as U.S. Pat. No. 9,561,833 on Feb. 2, 2017.

U.S. patent application Ser. No. 14/602,543 claimed priority of U.S. Provisional Patent Application 61/965,201 filed Jan. 27, 2014, which has since expired.

U.S. patent application Ser. No. 14/602,543 is also a Continuation-In-Part of U.S. patent application Ser. No. 13/914,490 filed Jun. 10, 2013, which was issued as U.S. Pat. No. 9,446,626 on Sep. 20, 2016.

U.S. patent application Ser. No. 13/914,490 is a Continuation-In-Part of U.S. patent application Ser. No. 12/655,433 filed Dec. 30, 2009, which was issued as U.S. Pat. No. 8,485,335 on Jul. 16, 2013.

U.S. patent application Ser. No. 12/655,433 claimed priority of U.S. Provisional Patent Application 61/204,130 filed Jan. 2, 2009, which has since expired.

BACKGROUND

Field of the Invention

The present invention relates to a vehicle wheel axle assembly including a stationary axle. The axle assembly includes an axle sleeve and a control shaft that is axially guided and axially displaceable within the axle sleeve. The axle assembly includes a retaining means that may: control the axial position of the control shaft relative to the axle sleeve; and/or retain the control shaft with the axle sleeve; and/or provide tactile feedback to the operator that may be used to signal a preferred axial position of the control shaft relative to the axle sleeve. Preferably, the control shaft is coaxial and rotatable relative to the axle sleeve.

Discussion of Prior Art

U.S. Pat. No. 6,089,675 describes a vehicle (i.e. bicycle) wheel hub that includes a control shaft that is internally coaxial with an axle sleeve. As illustrated in FIGS. 4a-f of this patent, the control shaft is axially displaceable relative to the axle sleeve, however the control shaft has a blocking engagement with the axle sleeve that prevents the control shaft from being withdrawn and removed from the axle sleeve without completely disassembling the hub assembly.

It is often desirable to remove the control shaft from the axle sleeve in order to service the hub and/or to replace the control shaft with a different type. For example, different bicycles may include dropouts that have different threading or that may be of a different type. In such a case, when swapping wheels and bicycle frames, it may be desirable to also swap out the control shaft to insure compatibility with the dropouts of a given frame. Since the control shaft of U.S. Pat. No. 6,089,675 cannot be removed from the sleeve, the entire axle assembly must be disassembled in order to replace the control shaft. This is a great inconvenience to the operator since this is a time-consuming procedure and also requires special tools and skills that many operators may not have.

While there are conventional through-axle axle assemblies available, these assemblies lack any means to retain the control shaft with the axle sleeve and the control shaft may easily become inadvertently separated from the axle sleeve. This is an inconvenience for the operator. Further, the control shaft may then become lost or misplaced or damaged. Further still, these conventional through-axle assemblies do not require, nor do they provide, any means to control the axial position of the control shaft relative to the axle sleeve.

In certain axle assemblies, such as FIGS. 4a-f of U.S. Pat. No. 6,089,675, it is desirable to provide some means to control the axial position of the control shaft, particularly when positioning the control shaft in the precise axial location such that it may be radially assembled and disassembled to the dropouts. Since conventional through-axle assemblies lack this ability for axial position control, the operator must manually position the control shaft in the proper axial position by trial-and-error in order to install and remove the wheel to/from the dropouts of the frame. For the operator, this adds significant frustration, complexity, and skill requirement to this installation and removal process.

Accordingly, it is an objective of the present invention to overcome the forgoing disadvantages and provide an improved vehicle wheel hub assembly, particularly as applied to a bicycle wheel.

SUMMARY OF THE INVENTION—OBJECTS AND ADVANTAGES

The present invention utilizes an engagement interface between the control shaft and the axle sleeve. This engagement interface is a radially overlapping overlie engagement interface that serves to axially retain the control shaft with the axle sleeve, and which has the benefit of restricting the control shaft from being inadvertently separated, helping to prevent it from being lost, misplaced, or damaged.

As an additional benefit, this interface can be utilized to provide a stop to restrain and/or limit the axial travel of the control shaft at a predetermined axial position relative to the axle sleeve. This may serve to control the axial position of the control shaft in the extending direction and/or the retracting direction such that the control shaft is properly axially aligned to provide the requisite clearance to install and remove the wheel to/from the dropouts of the frame.

As a further benefit, this interface may serve to provide tactile feedback to the operator to indicate that the control shaft is in the predetermined axial position relative to the axle sleeve. This provides a helpful convenience for the operator and eliminates the trial-and-error associated with axially positioning the control shaft of conventional through-axle arrangements. In the case where the pre-determined axial position corresponds to the retracted position, this minimizes the operator's frustration, complexity, and skill requirement associated with the wheel installation and removal process.

As a still further benefit, this engagement interface may be selectively defeated or overcome by circumferentially orienting the control shaft with the axle sleeve to permit the control shaft to be withdrawn and removed from the axle sleeve and the remainder of the hub assembly without any additional action or disassembly of other components required. Since the control shaft may be easily withdrawn and removed from the axle sleeve, the operator may easily swap out different control shafts and may easily service and clean the control shaft without completely disassembling the hub assembly.

BRIEF DESCRIPTION OF THE DRAWINGS

The present invention will be more readily understandable from a consideration of the accompanying drawings, wherein:

FIG. 2b is an exploded perspective view of the embodiment of FIG. 2a, with the control shaft first assembled to the axle sleeve and with the hub assembly in preparation for its assembly with the dropouts, and with the control shaft shown in the retracted position;

FIG. 2c is a perspective view of the embodiment of FIG. 2a, with the hub assembly next radially pre-assembled to the dropouts, with the control shaft still in the retracted position.

FIG. 2d is a perspective view of the embodiment of FIG. 2a, with the control shaft next displaced to the extended position such that the collar portion is axially overlapping the second dropout and the engagement end is threadably assembled to the right dropout.

FIGS. 2e-k are cross-section views of the embodiment of FIG. 2a, taken along 124-124, showing the progressive sequence of operations involved in assembling the control shaft and hub assembly with the dropouts of the frame;

FIG. 2e is an exploded axial cross-section view of the embodiment of FIG. 2a, corresponding to the assembly sequence of FIG. 2a, showing the dropouts of the bicycle frame and the hub assembly, including a control shaft shown prior to its assembly with the axle sleeve;

FIG. 2f is a radial cross-section view of the control shaft of the embodiment of FIG. 2a, showing the control shaft as initially partially inserted within the axle sleeve, corresponding to the transition between FIG. 2a and FIG. 2b, with the external threads of the control shaft axially inboard of the internal threads of the axle sleeve;

FIG. 2g is a radial cross-section view of the control shaft of the embodiment of FIG. 2a, showing the control shaft next further inserted and rotated within the axle sleeve such that the external threads of the control shaft are next further axially advanced to be threadably mated and axially overlapping the internal threads of the axle sleeve;

FIG. 2h is a radial cross-section view of the control shaft of the embodiment of FIG. 2a, showing the control shaft next further inserted and rotated within the axle sleeve such that the external threads of the control shaft are axially advanced to be axially outboard of the internal threads of the axle sleeve;

FIG. 2i is a radial cross-section exploded view of the embodiment of FIG. 2a, corresponding to the assembly sequence of FIG. 2b, with the control shaft next axially withdrawn to the retracted position such that the axially inboard thread start of the external threads is axially abutting the axially outboard thread start of the internal threads, and with the hub assembly in preparation for its assembly with the dropouts;

FIG. 2j is an axial cross-section view of the embodiment of FIG. 2a, corresponding to the assembly sequence of FIG. 2c, with the hub assembly as next radially pre-assembled to the dropouts, and with the control shaft still in the retracted position;

FIG. 2k is an axial cross-section view of the embodiment of FIG. 2a, corresponding to the assembly sequence of FIG. 2d, with the control shaft in the extended position such that the collar portion is axially overlapping the second dropout and the engagement end is threadably assembled to the first dropout;

FIG. 3a is an exploded perspective view of a second embodiment of the present invention, showing the dropouts of the bicycle frame and a hub assembly, including a control shaft shown prior to its assembly with the axle sleeve, with the engagement pin of the control shaft circumferentially aligned with the channel of the axle sleeve;

FIG. 3b is a perspective view of the control shaft and hub assembly of the embodiment of FIG. 3a, showing the control shaft initially partially inserted within the axle sleeve, with the engagement pin of the control shaft circumferentially aligned with the channel of the axle sleeve;

FIG. 3c is a perspective view of the control shaft and hub assembly of the embodiment of FIG. 3a, showing the control shaft next further inserted within the axle sleeve, with the engagement pin of the control shaft axially overlapping the channel of the axle sleeve;

FIG. 3d is an exploded perspective view of the control shaft and hub assembly of the embodiment of FIG. 3a, showing the control shaft next further inserted within the axle sleeve, with the engagement pin of the control shaft axially advanced beyond the channel of the axle sleeve and rotated such that the engagement pin is circumferentially displaced relative to the channel, then axially withdrawn to the retracted position, and with the hub assembly in preparation for its assembly with the dropouts;

FIG. 3e is a perspective view of the embodiment of FIG. 3a, with the hub assembly next radially pre-assembled to the dropouts, with the control shaft still in the retracted position.

FIG. 3f is a perspective view of the embodiment of FIG. 3a, with the control shaft next displaced to the extended position such that the collar portion is axially overlapping the second dropout and the engagement end is threadably assembled to the right dropout.

FIG. 3h is a radial cross-section view of the control shaft of the embodiment of FIG. 3a, corresponding to the transition between the assembly sequences of FIGS. 3b and 3c, showing the control shaft initially as next partially inserted within the axle sleeve, with the engagement pin of the control shaft axially overlapping the channel of the axle sleeve;

FIG. 3i is a radial cross-section view of the control shaft of the embodiment of FIG. 3a, showing the control shaft as next further inserted such that the engagement pin of the control shaft is axially advanced beyond the channel of the axle sleeve;

FIG. 3j is a radial cross-section exploded view of the control shaft of the embodiment of FIG. 3a, corresponding to the assembly sequence of FIG. 3d, showing the control shaft as next rotated such that the engagement pin is circumferentially displaced relative to the channel and then axially withdrawn to the retracted position where the engagement pin is axially abutting the engagement surface of the axle sleeve, and with the hub assembly in preparation for its assembly with the dropouts;

FIG. 3k is a radial cross section view of the embodiment of FIG. 3a, corresponding to the assembly sequence of FIG. 3e, with the hub assembly next radially pre-assembled to the dropouts, with the control shaft still in the retracted position.

FIG. 3L is radial cross section view of the embodiment of FIG. 3a, corresponding to the assembly sequence of FIG. 3f, with the control shaft next displaced to the extended position such that the collar portion is axially overlapping the second dropout and the engagement end is threadably assembled to the right dropout.

DETAILED DESCRIPTION OF THE INVENTION

Figure 1:
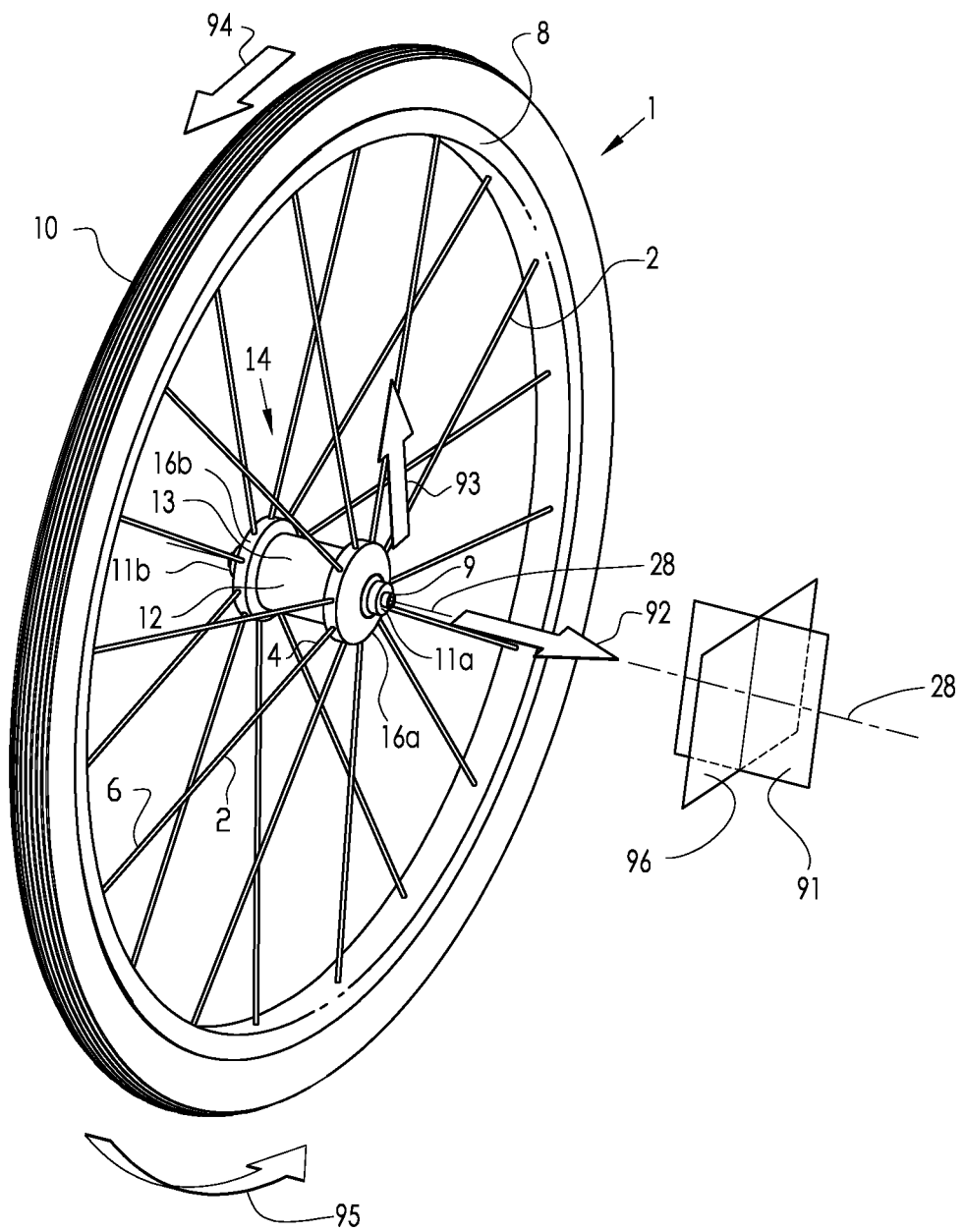
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes a hub body 13 with at least two axially spaced hub flanges 16a and 16b, each of which include a means for connecting with the spokes (not shown). The axle 9 includes end faces 11a and 11b to interface with the dropouts (not shown). The axial axis 28 is the axial centerline of rotation of the bicycle wheel 1. The hub flanges 16a and 16b may be contiguous with the hub shell 12 or may be separately formed and assembled to the hub body 13 portion of the hub shell 12. The spokes 2 are affixed to the hub flanges 16a or 16b at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

Figure 2A:
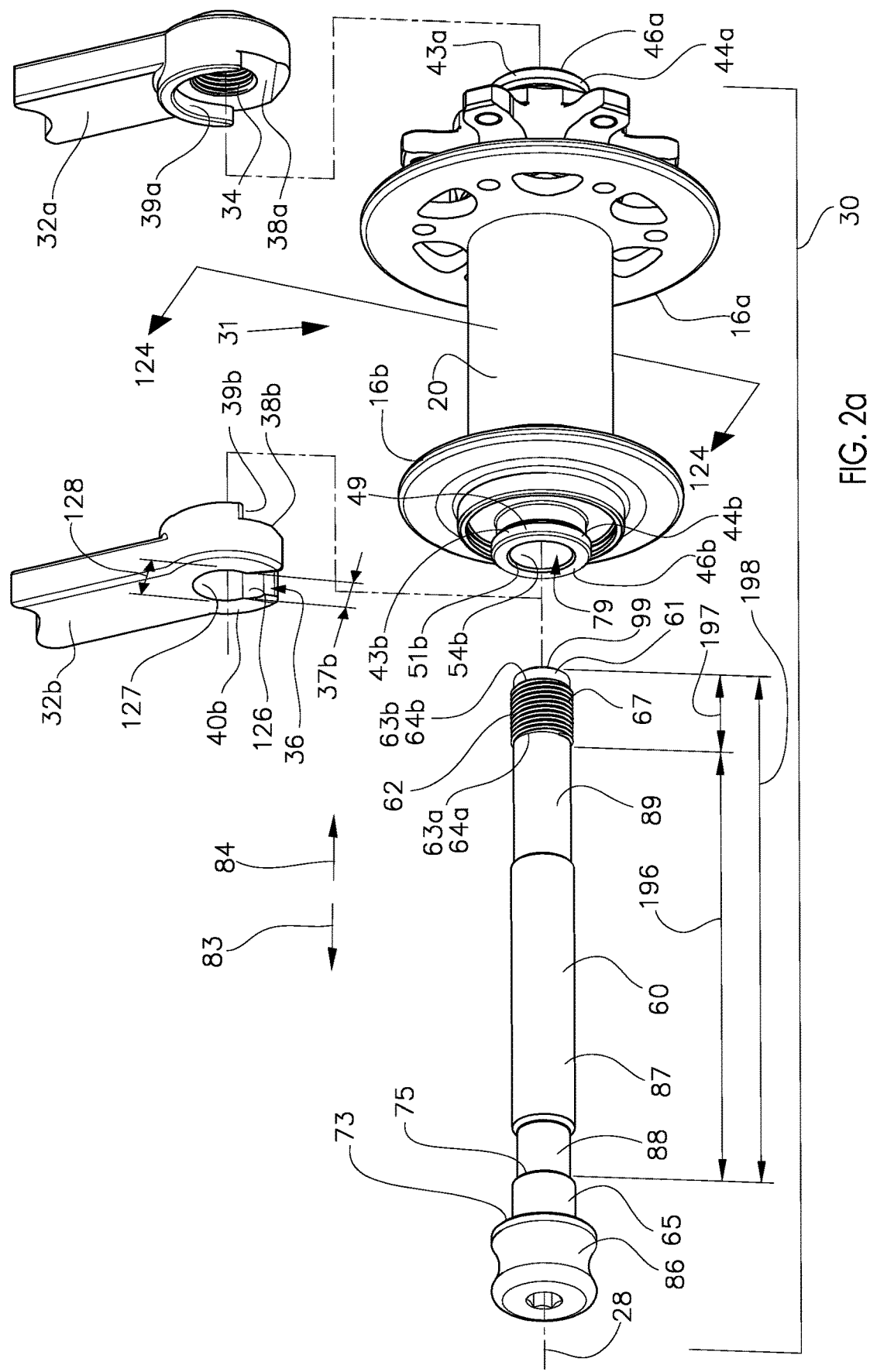
FIG. 2a is an exploded perspective view of a first embodiment of the present invention, showing the dropouts of the bicycle frame and a hub assembly, including a control shaft shown prior to its assembly with the axle sleeve.

FIGS. 2a-k describe an embodiment of the present invention with a threaded engagement between a control shaft 60 of a hub assembly 30 and the dropout 32a of the frame. In this embodiment, the frame includes an open-slotted dropout 32b axially opposed to this threaded engagement, for quick and easy wheel removal. FIGS. 2a and 2e are exploded views, showing the control shaft prior to assembly with the sleeve assembly 49 of the hub 31 prior to the assembly of the hub assembly 30 with the dropouts 32a and 32b.

Referring to FIGS. 2a and 2e, dropouts 32a (left dropout) and 32b (right dropout) may be considered mounting portions of the bicycle (not shown) and constitute the portion of the bicycle frame (not shown) to which the hub assembly 30 is mounted or connected. Right dropout 32b is of a generally conventional design to accept through-axle hubs and includes an internally threaded hole 34, axially inboard face 38a, and alignment surface 39a. Right dropout 32b includes an open keyhole slot 36 that is radially stepped to include a narrower necked entrance region 126 of radial width 37b and a wider enlarged circular pilot region 127 of radial width 128. This radial step occurs within the axial region between inboard face 38b and outboard face 40b. Dropout 32b also includes an axially inboard face 38b, and an axially outboard face 40b. Inboard faces 38a and 38b each include a corresponding axially inwardly projecting alignment surfaces 39a and 39b to provide radial positioning location of mating alignment surfaces 43a and 43b of axlecaps 44a and 44b respectively. Open keyhole slot 36 has a radially extending open entrance to receive the control shaft 60.

Inboard faces 38a and 38b are axially opposed and face each other, while outer face 40b is axially opposed to inboard face 38b. Width 37b of the necked entrance region 126 of open slot 36 is sized to receive the necked portion 88 of the control shaft 60 and width 128 of the pilot region 127 is sized to receive collar portion 65. The dropouts 32a and 32b shown here are more typical of the front dropouts of a bicycle frame, but the rear dropouts may be similar in design and it is understood that this design is representative of a wide range of dropout designs, either conventional or unconventional, front or rear, etc.

The hub 31 includes sleeve assembly 49, bearing assemblies 33a and 33b, and hub shell 20. In this case, the sleeve assembly 49 is generally stationary and intended to be rotationally fixed to the frame of the bicycle, while the hub shell 20 is rotatable about axial axis 28 and about the sleeve assembly 49 by means of bearing assemblies 33a and 33b. The axle assembly includes the sleeve assembly 49 and the control shaft 60. The hub assembly 30 includes the hub 31 and the control shaft 60. Bearing assemblies 33a and 33b are shown here as conventional "cartridge" type bearing assemblies, including rolling elements, an inner race, and an outer race. The hub shell 20 includes two hub flanges 16a and 16b that are adapted with spoke holes (omitted here for clarity) to connect with the first ends of spokes (not shown) in the conventional manner. The sleeve assembly 49 includes sleeve 42 and axlecaps 44a and 44b, and this combined assembly may be also termed the "axle sleeve".

As particularly shown in FIG. 2e, axlecaps 44a and 44b each include respective outer faces 46a and 46b, collar portions 55a and 55b with end faces 48a and 48b, cylindrical alignment surfaces 43a and 43b, shoulders 47a and 47b, and axially extending holes 54a and 54b therethrough with axially inboard and axially outboard chamfers 51a and 51b. The diameter of holes 54a and 54b are preferably sized to provide a radially piloting sliding fit with the shank portion 87 of the control shaft 60. The outside diameter of collar portions 55a and 55b are preferably sized to have a close alignment fit with the inside diameter of bearing assemblies 33a and 33b respectively. The sleeve 42 is a generally cylindrical tube that includes an axial bore 78 therethrough with end face 77a and 77b. The diameter of bore 78 is preferably sized to have a close locating fit with the outside diameter of collar portions 55a and 55b such that the sleeve 42 and axlecaps 44a and 44b are radially piloted to sandwich the inner races of bearing assemblies 33a and 33b. It may be preferable that axlecaps 44a and 44b are axially locked to the sleeve 42 (by means of this press fit or by other means known in industry) such that any axial displacement therebetween is limited. The hole 54a of axlecap 44a includes internal threads 52 to threadably mate with external threads 62, and bores 52a and 53b of a diameter to provide radial clearance with the outside diameter of external threads 62. There are radial transitions 56a and 56b between the inside diameter of internal threads 52 and the bores 53a and 53b respectively. The transition 56a is preferably axially located at a prescribed and predetermined axial distance 195 from the outer face 46a. The transitions 56a and 56b are a surfaces that correspond to the axially outboard terminus and axially inboard terminus of threads 62 respectively. The transition 56a includes thread end 57a, which is defined as the axially outwardly projecting transition surface corresponding to the axially outboard terminus of the helical thread rib(s) of the internal threads 52. Similarly, the transition 56b includes thread end 57b, which is defined as the axially inwardly projecting surface corresponding to the axially inboard terminus of the thread rib(s) of the internal threads 52. Since the thread rib of internal threads 52 is/are necessarily circumferentially adjacent a corresponding helical thread groove, the thread ends 57a and 57b also include the respective portions of internal thread flank that are exposed to project axially outwardly and axially inwardly respectively through the axially projecting window created by the thread groove(s).

Bearing assemblies 33a and 33b are first assembled to the hub shell 20 in the conventional manner, with sleeve 42 positioned between their respective inner races. Axlecap 44a is next assembled such that collar portion 55a extends through the inside diameter of bearing 33a and to axially overlap bore 78. Similarly, axlecap 44b is assembled such that collar portion 55b extends through the inside diameter of bearing 33b to axially overlap bore 78. Holes 54a and 54b and bore 78 combine to create a continuous through opening 79 to receive the control shaft 60. Bearing assemblies 33a and 33b are preferably axially sandwiched between respective shoulders 47a and 47b and end faces 48a and 48b, resulting in a solid axially abutting stack between outer faces 46a and 46b. Axlecaps 44a and 44b and sleeve 42 combine to create a sleeve assembly 49 where the opening 79 is radially stepped between radially inward holes 54a and 54b and radially outward bore 78.

Control shaft 60 includes a shank portion 87 and an enlarged head portion 86, with a grip face 73 serving as a transition surface between the collar portion 65 and head portion 86. The shank portion 87 extends axially from the grip face 73 to the engagement end 67. Engagement end 67 of the shank portion 87 includes end face 99 and pilot portion 61. Shank portion 87 also includes a cylindrical collar portion 65 of larger diameter and a necked portion 88 that is concentric with collar portion 65 and is of smaller diameter such that there is a step or transition surface 75 therebetween. The necked portion 88 may be considered as a radially relieved surface relative to the collar portion 65 and the collar portion 65 may be considered as a radially enlarged surface relative to the necked portion 88. The shank portion 87 includes end face 99 and external threads 62 at its engagement end 67. End face 99 and transition surface 75, which correspond to first and second leading engagement edges of the control shaft 60 respectively, are axially separated by engagement distance 198, which preferably corresponds to the axial distance between the outboard face 40b and the inboard face 38a. The head portion 86 extends axially outwardly from the grip face 73 and includes hex socket 66 o receive a hex key (not shown) to provide additional tightening torque and leverage when the control shaft 60 is manipulated by the operator in the conventional manner Hex socket 66 is provided as a representative means to facilitate the manual rotation of the control shaft 60. A wide range of alternate means, including levers or handles may be substituted to provide similar manual rotation means.

Shank portion 87 also includes a relieved surface 89 that is radially relieved from the outside diameter of the external threads 62 and that is preferably of a diameter that is smaller than or equal to the root diameter of external threads 62. There is a radial transition 63a between the relieved surface 89 and the external threads 62 and a radial transition 63b between the pilot portion 61 and the external threads 62. The transition 63a is axially located at a prescribed and predetermined axial distance 197 from the end face 99 and a prescribed and predetermined axial distance 196 from the transition surface 75. The transition 63a includes thread end 64a, which is defined as the axially inwardly projecting surface corresponding to the axially inboard terminus of the helical thread rib(s) of the external threads 62. Similarly, the transition 63b includes thread end 64b that is defined as the axially outwardly projecting surface corresponding to the axially outboard terminus of the thread rib(s) of the external threads 62. Since the thread rib(s) of external threads 62 is/are necessarily circumferentially adjacent a corresponding helical thread groove, the thread ends 64a and 64b also include the respective portions of thread flank that are exposed to project axially inwardly and axially outwardly respectively through the axially projecting window created by the thread groove(s).

As shown in FIGS. 2a and 2e, the control shaft 60 is completely withdrawn in the retracting direction 83 to be separated from the hub 31. The hub 31 is shown to be positioned to be axially aligned and radially offset from dropouts 32a and 32b.

As shown in FIG. 2f, the control shaft 60 has next been inserted into the opening 79 in the extending direction 84 by first passing the engagement end 67 through the hole 54b, then bore 78, then bore 53b. Since there is radial clearance between the shank portion 87 and the hole 54b and bore 53b, this axial displacement and insertion is free and easy and without appreciable radial binding and/or axial resistance therebetween up to this point. "Free" axial displacement is defined herein as axial displacement between the control shaft 60 and sleeve assembly with clearance therebetween and without appreciable binding or interference.

Figure 2B:
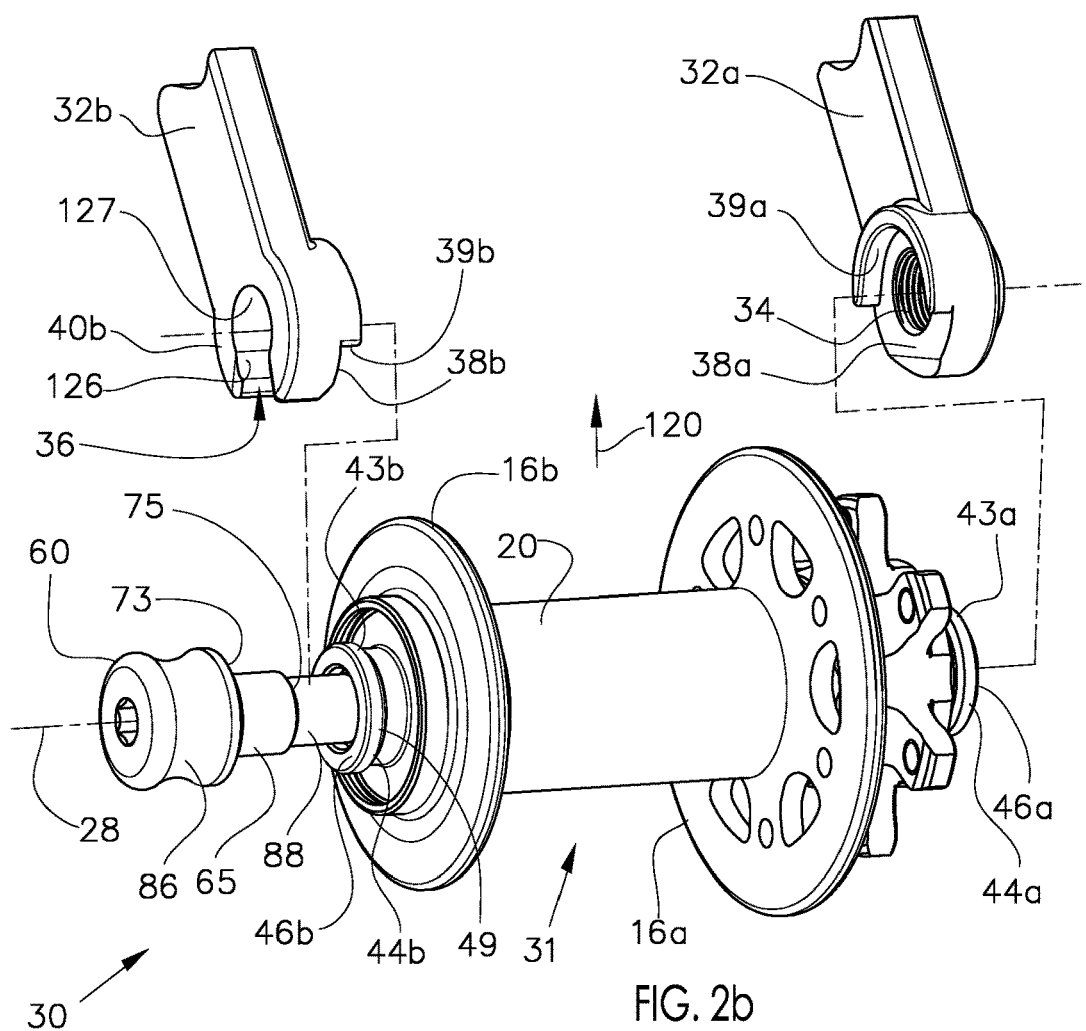
FIGS. 2b-d are perspective views of the embodiment of FIG. 2a, showing the progressive sequence of operations involved in assembling the control shaft and hub assembly to the dropouts of the frame.
Figure 2C:
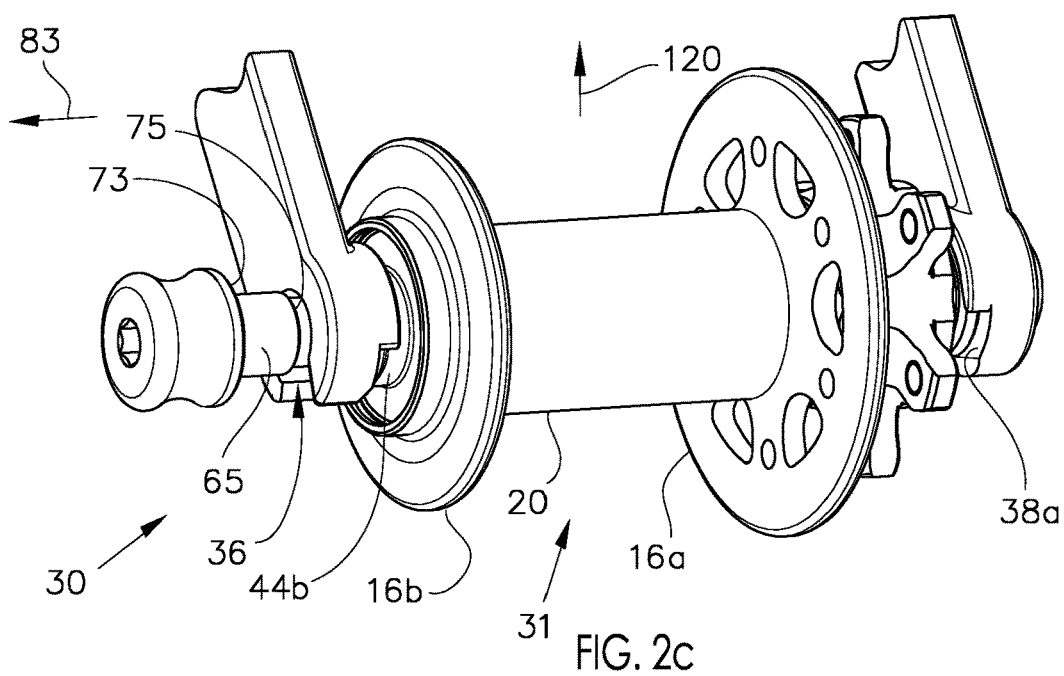
Figure 2D:
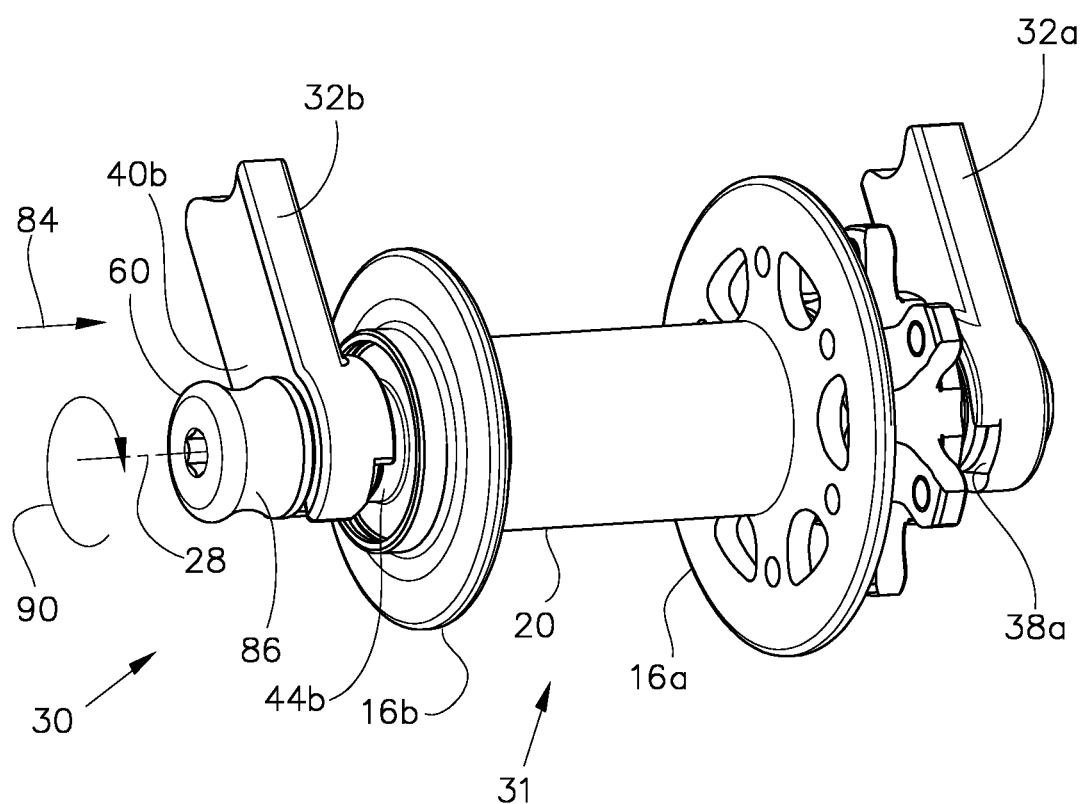
Figure 2G:
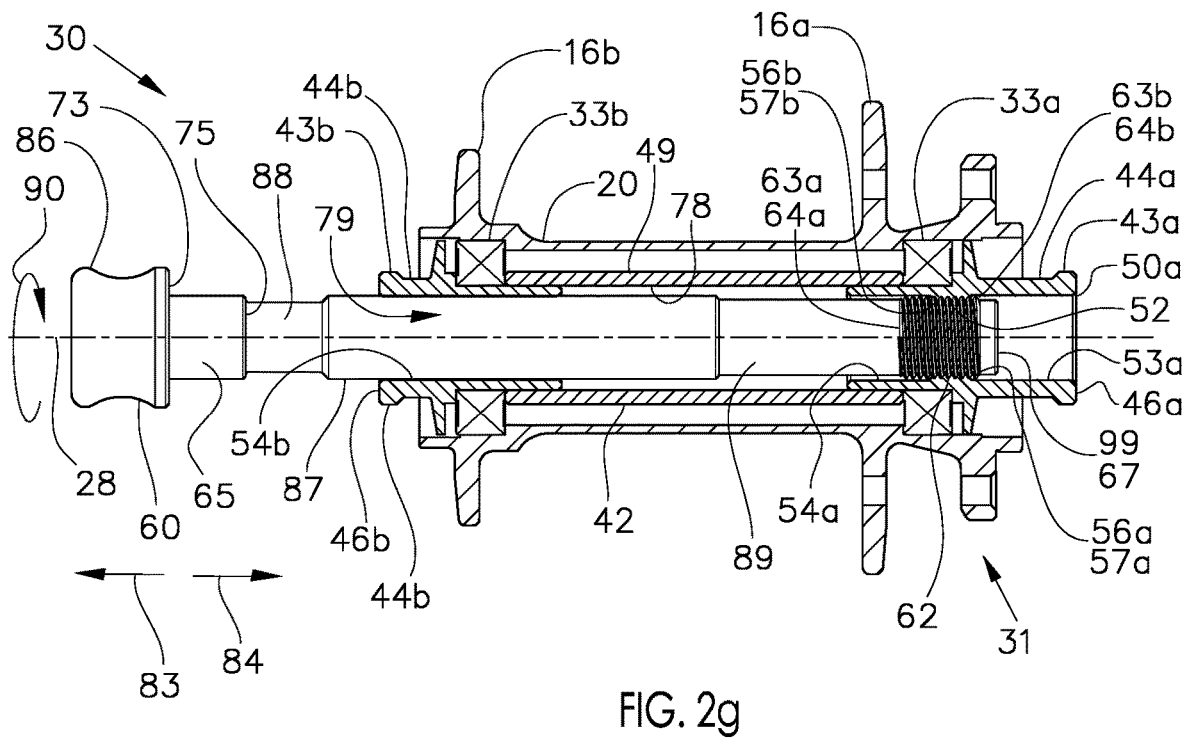
Figure 2H:
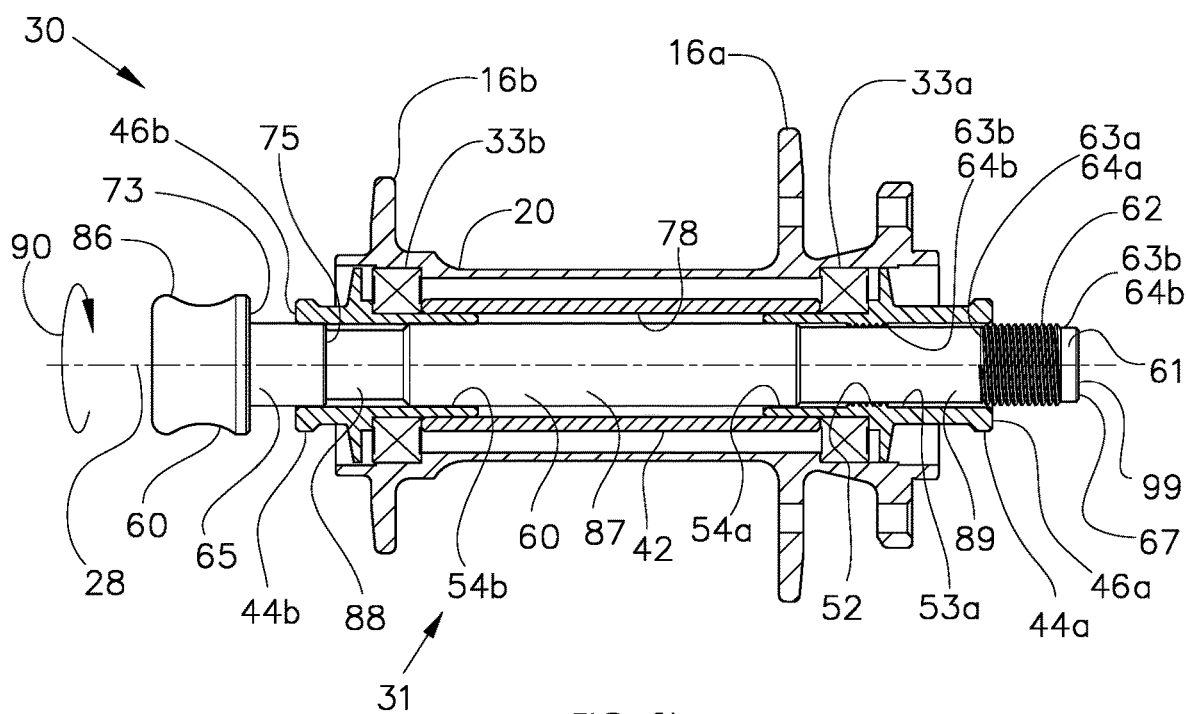

Next, as shown in FIG. 2g, the control shaft 60 is further advanced in the extending direction 84 until thread end 64b abuts thread end 57b. The control shaft 60 is then rotated in direction 90 relative to axlecap 44a until the thread rib of external thread 62 is circumferentially aligned with the thread groove of internal thread 52 and the thread rib of internal thread 52 is circumferentially aligned with the thread groove of external thread 62. This circumferential alignment provides an escapement orientation where the thread ribs and thread grooves may allow the control shaft 60 to axially shift slightly in direction 84 to initiate threadable engagement between external threads 62 with internal threads 52. Further rotation of the control shaft 60 in direction 90 causes the external threads 62 to threadably overlap the internal threads 52 as shown in FIG. 2g. Then, further rotation (in direction 90) of the control shaft 60 causes the external threads 62 to advance in direction 84 until the external threads 62 have passed clear through internal threads 52 to be positioned axially outward of internal threads 52 (with transition 63a axially outboard of transition 56a) as shown in FIG. 2h. Since the relieved surface 89 is of smaller diameter than the internal threads 52, the control shaft 60 may now be easily slideably axially shuttled and extended further in direction 84 as shown in FIG. 2h.

For purposes of definition herein, the term "escapement" refers to an arrangement including an opening, such as a relief, channel, or groove, in a first member and a projection of a second member, whereby the opening provides a vent through which the projection may pass and "escape". The vent includes entrances at both of its longitudinally spaced ends and preferably communicates with an overlie engagement at one end and with the exterior of the first member at its other end. This escapement occurs at a given circumferential orientation between the first and second members. In the embodiment of FIGS. 2a-k, the vent includes the helical thread groove(s) of external threads 62 and the projection includes the helical thread rib(s) of internal threads 52. Similarly, the vent includes the helical thread groove(s) of internal threads 52 and the projection includes the helical thread rib(s) of external threads 62. At a different circumferential orientation, this escapement is defeated and the projection is may not pass through the vent and is otherwise engaged or limited in its axial displacement. In this embodiment, the vent is also the helical thread groove of internal threads 52 and the projection of the helical thread ribs of external threads 62. The vents allow the mating projections to pass axially therethrough when the ribs are circumferentially aligned with the grooves.

It may be considered that external threads 62 are comprised of a radially outwardly projecting helical thread rib that is circumferentially offset and staggered from a radially inwardly projecting helical channel or groove as is common in the geometry of external threads. Further, the axially inboard terminus and axially outboard terminus of this thread rib serves to create the transitions 63a and 63b (i.e. thread ends 64a and 64b, respectively). These transitions 63a and 63b are circumferentially interrupted by the respective entrances of the helical groove. Similarly, it may be considered that internal threads 52 are comprised of a radially inwardly projecting helical thread rib that is circumferentially offset and staggered from a radially outwardly projecting helical groove as is common in the geometry of internal threads. Further, the axially outboard terminus of this internal thread rib serves to create the transition 56a and thread end 57a and the axially inboard terminus of this internal thread rib serves to create the transition 56b and thread end 57b. These transitions 56a and 63b are circumferentially interrupted by the respective entrances of the helical groove. In a threadable engagement, the thread rib of the external threads 62 radially overlaps and engages with the helical groove of the internal threads 52 and the thread rib of the internal threads 52 radially overlaps and engages with the helical groove of the internal threads 62. This radial overlap between mating ribs and grooves allows the control shaft 60 to be axially displaced relative to the sleeve assembly 49 and, since relieved surface 89 is radially inward from the inside diameter of internal threads 52, the control shaft 60 may be axially outwardly shuttled once the external threads 62 have advanced axially outwardly from the internal threads 52 and internal threads are axially overlapping the relieved surface 89. Similarly, since hole 54b, bore 78, and bore 53b are all larger in diameter than external threads 62, the control shaft 60 may be axially inwardly shuttled and withdrawn once the external threads 62 have advanced axially inwardly from the internal threads 52.

Figure 2I:
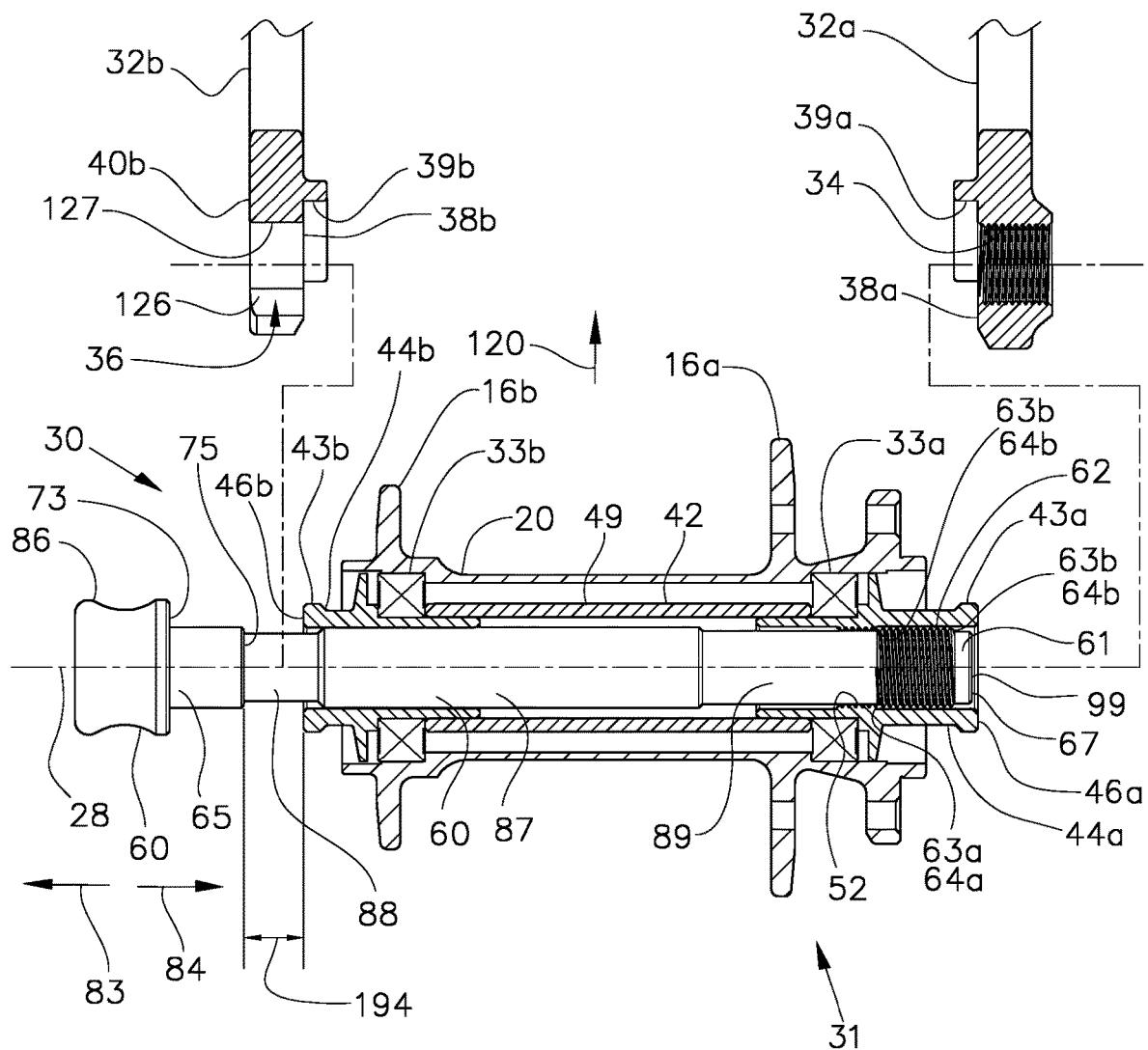

Next, as shown in FIGS. 2b and 2i, the control shaft 60 has been axially retracted and shuttled in direction 83 until thread end 64a axially abuts the thread end 57a and the control shaft 60 is in the axially retracted position relative to the sleeve assembly 49. As long as the control shaft 60 is not rotated in a direction opposite to direction 90, the axial abutment between transitions 56a and 63a (i.e. thread ends 64a and 57a, respectively) serves as an axial limit stop to control the axial travel of the control shaft 60 with respect to the sleeve assembly 49 and hub 31. Since distances 197 and 195 are controlled, this axial abutment corresponds to a retracted position of the control shaft 60 where the end face 99 is preferably axially flush or axially inboard of outer face 46a. Correspondingly, this retracted position also corresponds to a controlled axial distance 194 between transition surface 75 and outer face 46b. In this retracted position, the end face 99 is slightly axially inboard and recessed from end face 46a and the necked portion 88 is aligned to be extending axially outboard of end face 46b. The hub assembly 30 is shown to be axially aligned and radially offset from dropouts 32a and 32b in preparation for assembly thereto.

It is understood that it is possible that the control shaft 60 may axially shuttled toward the retracted position while being perfectly circumferentially oriented such that the inward terminus of the external thread is circumferentially aligned with the helical groove of internal thread 52 such that transitions 56a and 63a will not abut each other on contact. However, it is noted that the likelihood of this perfect circumferential alignment is rare and there will more often be some degree of circumferential overlap between the terminus of these thread ribs. Further, even if this perfect circumferential orientation does occur, since the thread helix angle is generally shallow, the mating thread flanks will immediately abut each other and the axial position of the control shaft 60, in this circumstance, will be very close and nearly identical to its axial position in the case where the thread ribs are abutting.

Figure 2J:
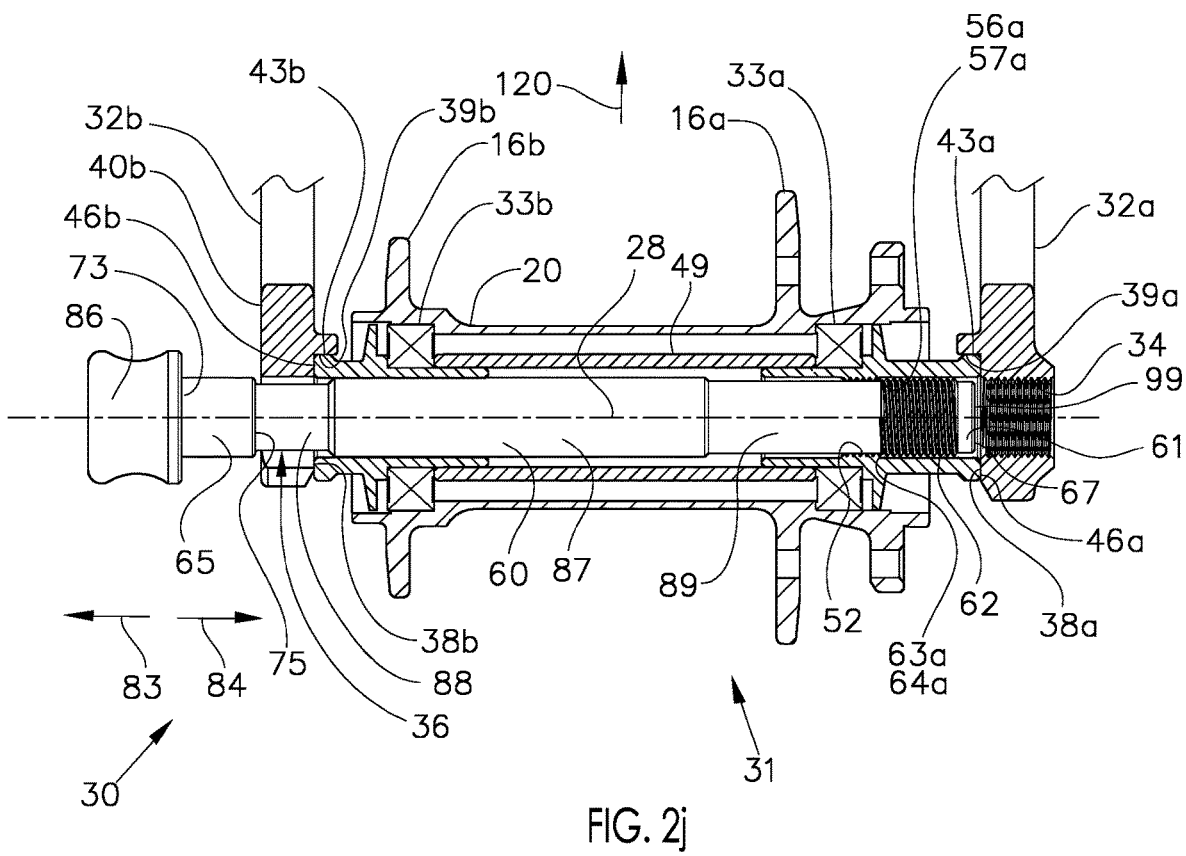

Next, as shown in FIGS. 2c and 2j, the hub assembly 30 is moved in the generally radial direction 120 relative to the dropouts 32a and 32b, with the control shaft 60 still in the retracted position, such that alignment surfaces 43a and 43b are each radially abutting and nested with respective alignment surfaces 39a and 39b to provide radial alignment between the hub assembly 30 and dropouts 32a and 32b. These nested engagements serve to provide a radial positioning depth stop of the sleeve assembly 49 and hub assembly 30 relative to the dropouts 32a and 32b in the conventional manner Transition surface 75 is axially coincident or preferably slightly axially outboard of outboard face 40b. Necked portion 88 has passed through necked entrance region 126 such that it is now radially centered within pilot region 127. Outer face 46a is also axially adjoining end face 38a while outer face 46b is also axially adjoining inboard face 38b to provide axial alignment between the hub assembly 30 and dropouts 32a and 32b. The external threads 62 are now radially aligned with internal threaded hole 34 and collar portion 65 is radially aligned with pilot region 127.

Figure 2K:
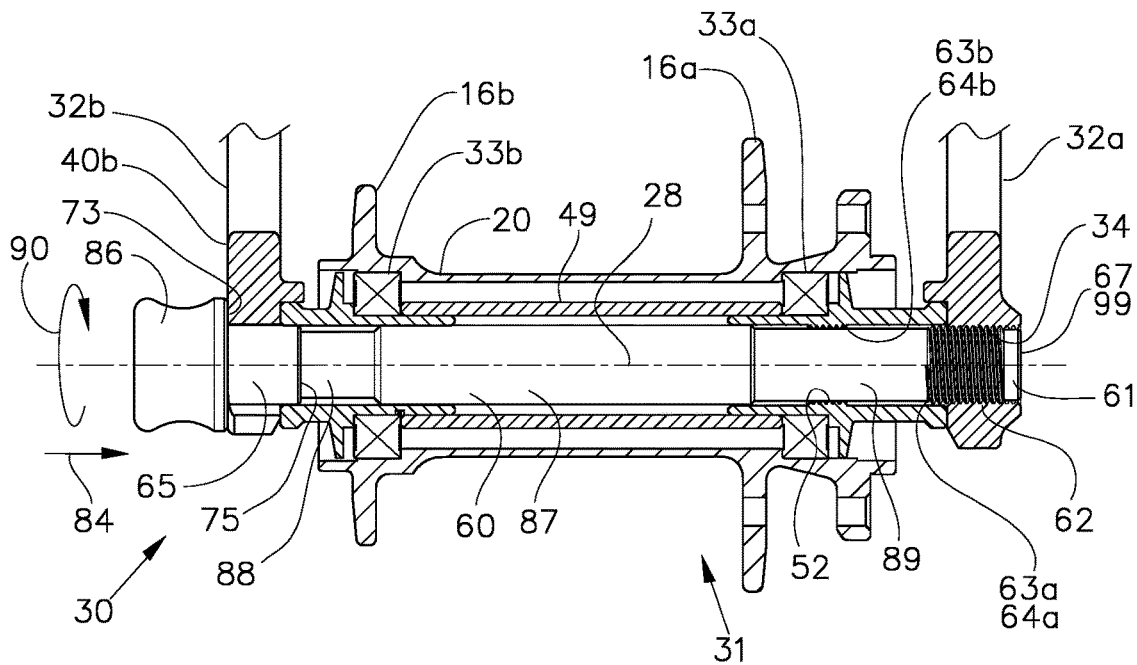

Next, as shown in FIGS. 2d and 2k, the operator has manually pressed the head portion 86 in the extending direction 84 to linearly displace and shuttle the control shaft 60 in direction 84 (the "extending direction") relative to sleeve assembly 49 to the point that the external threads 62 may now "catch" and be threadably engaged with internal threaded hole 34. The head portion 86 is then also simultaneously manually rotated (by means of a hex key (not shown) engaged with hex hole 66) in direction 90 to threadably engage external threads 62 with internal threaded hole 34 to threadably advance the control shaft 60 further in direction 84 until the grip face 73 axially presses and clamps against outboard face 40b.

Outer face 46a is now axially pressed against end face 38a and outer face 46b is also axially pressed against inboard face 38b and the control shaft 60 is in the engaged position. Further threadable tightening of the head portion 86 in direction 90 serves to axially draw outer face 46b toward grip face 73, thereby firmly clamping dropout 32b between grip face 73 and outer face 46b. The sleeve assembly 49 is also axially clamped between inboard faces 38a and 38b. The engagement end 67 is now fully axially overlapping the internal threaded opening 34 and the collar portion 65 is now fully axially overlapping the pilot region 127 to more positively radially retain the hub assembly 30 to the dropouts 32a and 32b. The control shaft 60 is now in the "extended position" relative to the sleeve assembly 49 and dropouts 32a and 32b. With the control shaft 60 fully threadably cinched and tightened as described above, it is now in the fully extended position relative to the sleeve assembly 49 and the hub assembly 30 is firmly clamped, installed, and assembled to the dropouts 32a ad 32b.

The procedure for uninstallation and removal of the hub assembly 30 from the dropouts 32a and 32b is basically the reverse of the assembly and installation sequence just described. For this removal, the control shaft 60 is first manually unthreaded from the internally threaded hole 34, in a direction opposite to direction 90, via head portion 86, until the external threads 62 are disengaged from the internally threaded hole 34, axially displacing the control shaft 60 in the retracting direction 83.

Once the threaded engagement between the external threads 62 and internal threaded hole 34 is fully unthreaded, the head portion 86 may then be freely linearly retracted and axially withdrawn in the retracting direction 83 until the thread end 64a axially abuts the thread end 57a and the control shaft 60 is in the retracted position as shown in FIGS. 2c and 2j. There is free and easy linear advancement of the control shaft 60 in between the extended and retracted positions because there is little or no interference or radial impingement therebetween such that very little retracting force is required by the operator.

Once the control shaft 60 has been displaced in the retracting direction 83 to the retracted position, the axially abutting and radially overlying engagement between transitions 63a and 56a provides a restraint against further advancement in direction 83, which serves to provide a tactile feedback to the operator indicating that the control shaft 60 is again in the axially retracted position as shown in FIGS. 2c and 2j. The retracted position also corresponds to the transition between the free axial displacement of the control shaft 60 and the restrained limited axial displacement of the abutting interface. This restrained limited axial displacement also serves to retain the control shaft 60 with the sleeve assembly 49 to restrain and resist the inadvertent separation between the two.

This tactile feedback lets the operator know that the retracted position has been achieved such that the end face 99 is recessed from outer face 46a and the necked portion 88 is axially aligned with the necked entrance region 126 such that engagement end 67 is no longer axially overlapping the internal threaded hole 34 and collar portion 65 is no longer axially overlapping the pilot region 127. This axially abutting engagement serves to axially restrain and limit the displacement of the control shaft 60 in the retracting direction 83 and provides a radially overlapping overlie engagement with the sleeve assembly 49 to restrain axial displacement therebetween.

The hub assembly 30 may now be radially disassembled and removed from the dropouts 32a and 32b in a direction opposite to direction 120 as shown in FIGS. 2b and 2i. It is noted that the control shaft 60 need not be completely withdrawn in the retracting direction 83 (as shown in FIG. 2a, for example) in order to remove the hub assembly 30 and control shaft 60 from the dropouts 32a and 32b. The hub assembly 30 may later be assembled to the dropouts 32a and 32b in the procedure previously described in FIGS. 2i-k. Thus the tactile feedback provided by the axially abutting engagement serves as an aid to the operator in detecting the retracted position during both the disassembly and assembly procedures with the dropouts 32a and 32b as described hereinabove.

In the case where the operator would like to completely withdraw and remove the control shaft 60 from the sleeve assembly 49, the operator may retract the control shaft 60 to the retracted position and then rotate the control shaft 60 in a direction opposite to direction 90 (relative to the sleeve assembly 49) while pulling the control shaft 60 in direction 83. The circumferential alignment of mating thread ribs and thread grooves (as described hereinabove) provides an axial escapement (as described hereinabove) permitting the external threads 62 to then be threadably engaged to internal threads 52 and to advance the control shaft 60 in direction 83 until the external threads 62 are fully axially inboard of the transition 56b and thread end 57b as shown in FIG. 2f, as is common in a threadable assembly. There is a small amount of circumferential clearance between the mating thread ribs and thread grooves such that the thread ribs may pass helically through the thread grooves. The control shaft 60 may next be further axially shuttled in direction 83 relative the sleeve assembly 49 until the control shaft 60 is fully withdrawn therefrom as shown in FIGS. 2a and 2e.

It is noted that the embodiment of FIGS. 2a-k describe an axially overlapping helical rib-and-groove engagement to provide an axial escapement means between the control shaft 60 and the sleeve assembly 49. In one circumferential orientation therebetween, this escapement allows the control shaft 60 to pass axially through the sleeve assembly 49 to withdraw and remove the control shaft 60 therefrom. In another circumferential orientation therebetween, the transitions 56a and 63a provide a blocking and/or retaining engagement therebetween to axially retain the control shaft 60 to the sleeve assembly 49. Preferably this retaining occurs at a controlled axial position of the control shaft 60 within the sleeve assembly 49. Preferably this axial position corresponds to a retracted position of the control shaft 60 such that the hub assembly 30 may be easily be assembled and/or disassembled to the dropouts as shown in FIGS. 2b and 2c.

Figure 3B:
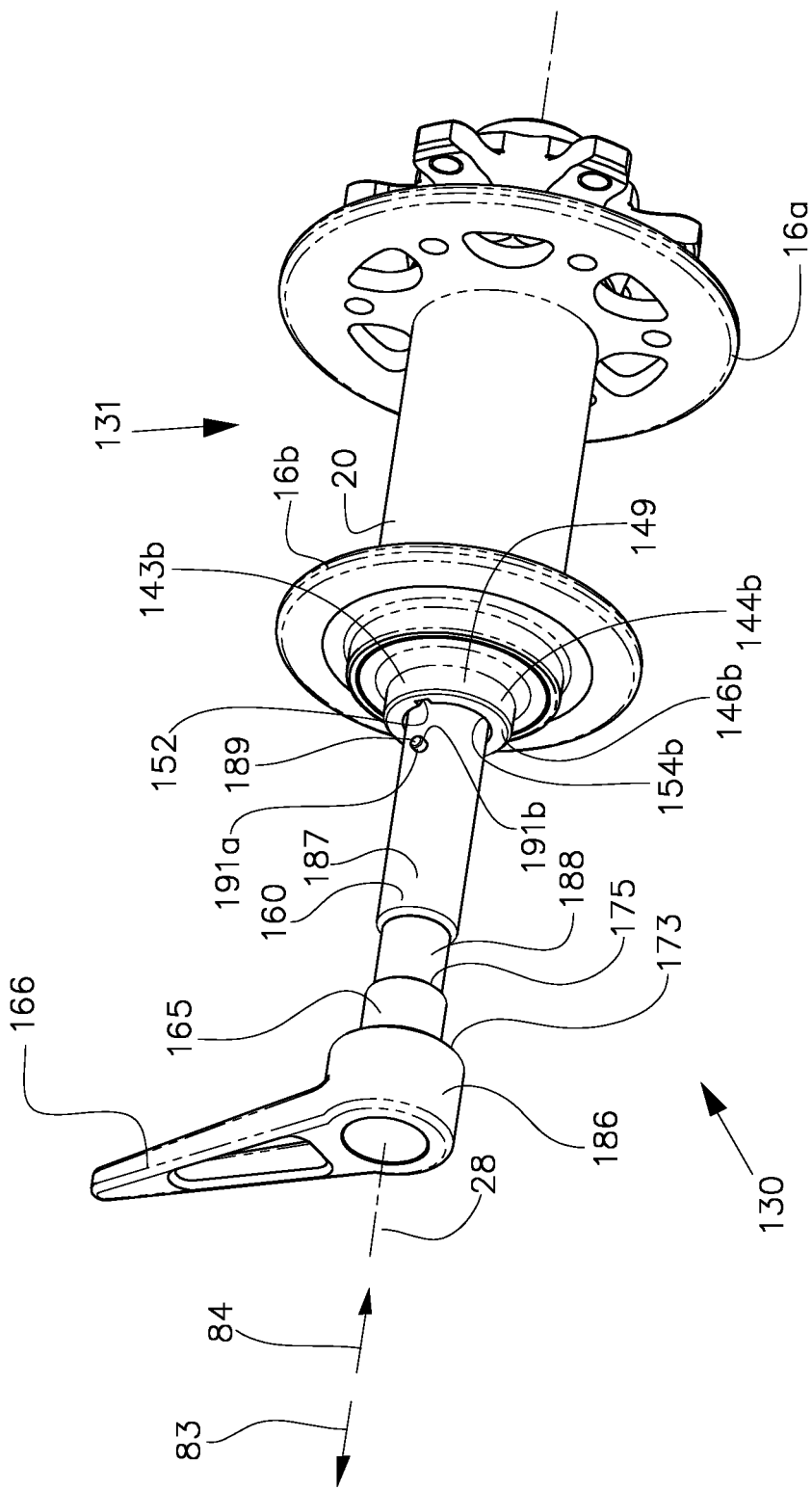
FIGS. 3b-f are perspective views of the embodiment of FIG. 3a, showing the progressive sequence of operations involved in assembling the control shaft and hub assembly with the dropouts of the frame.
Figure 3C:
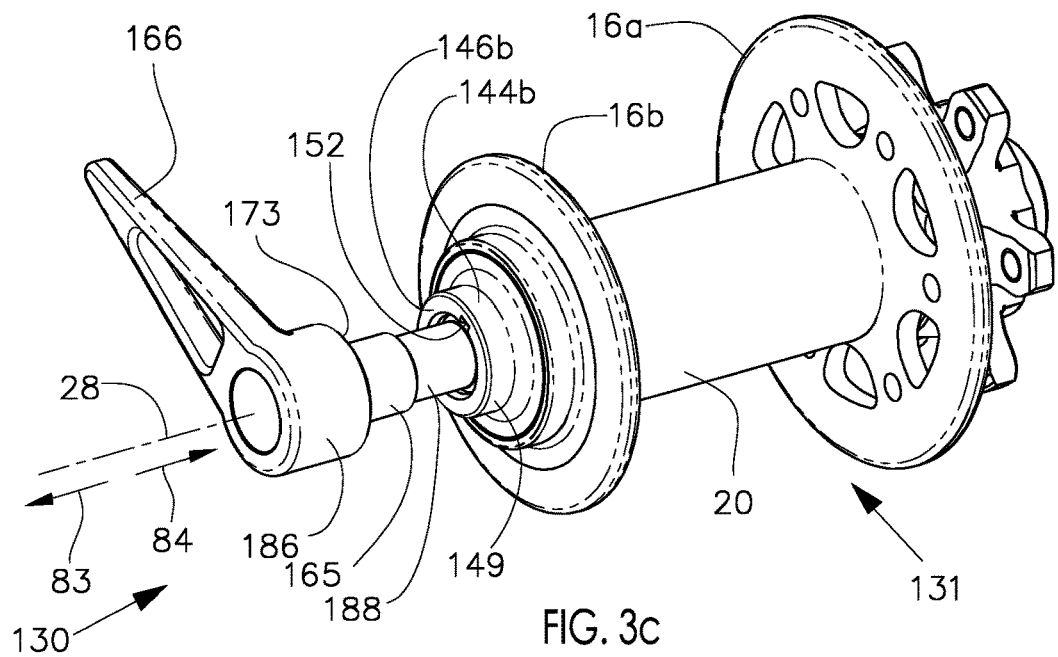
Figure 3D:
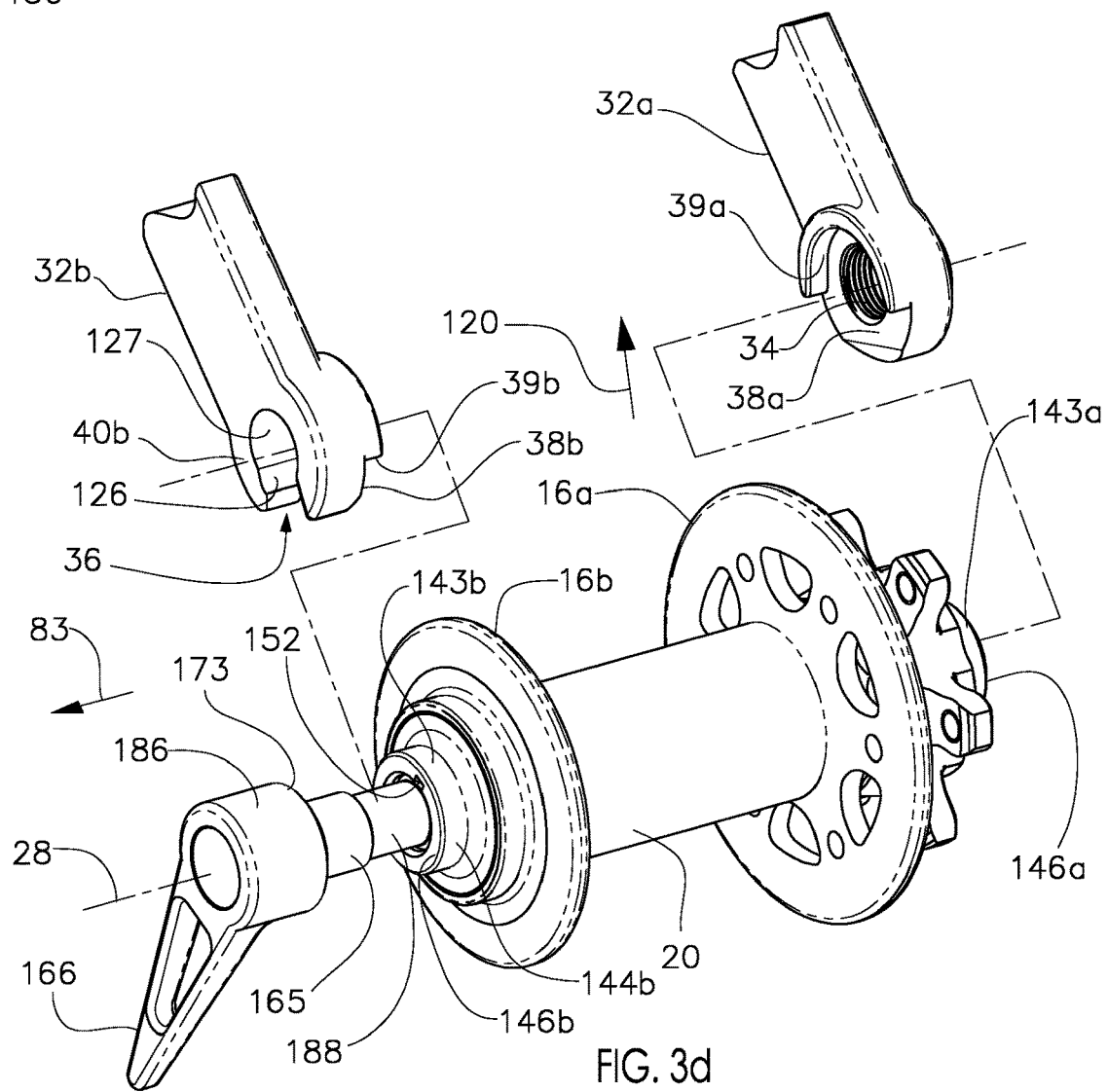
Figure 3E:
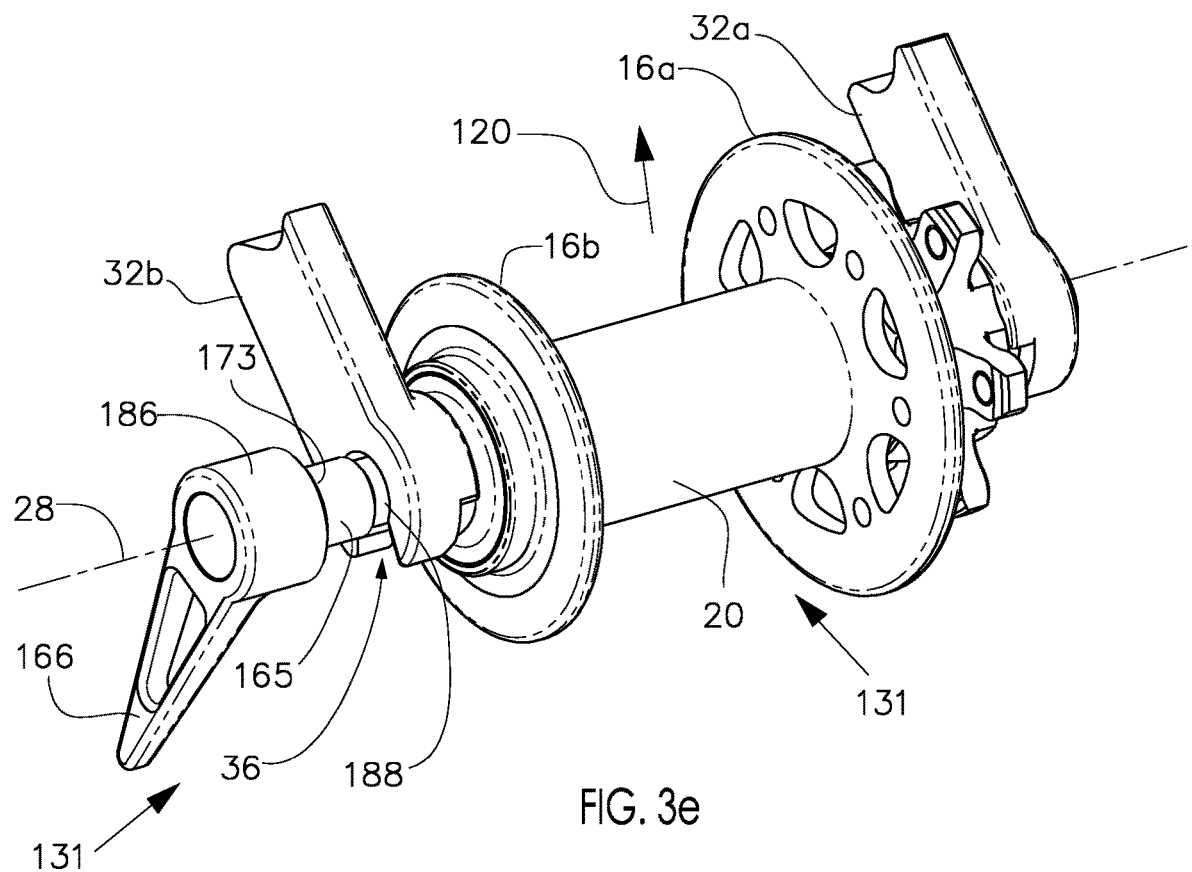
Figure 3F:
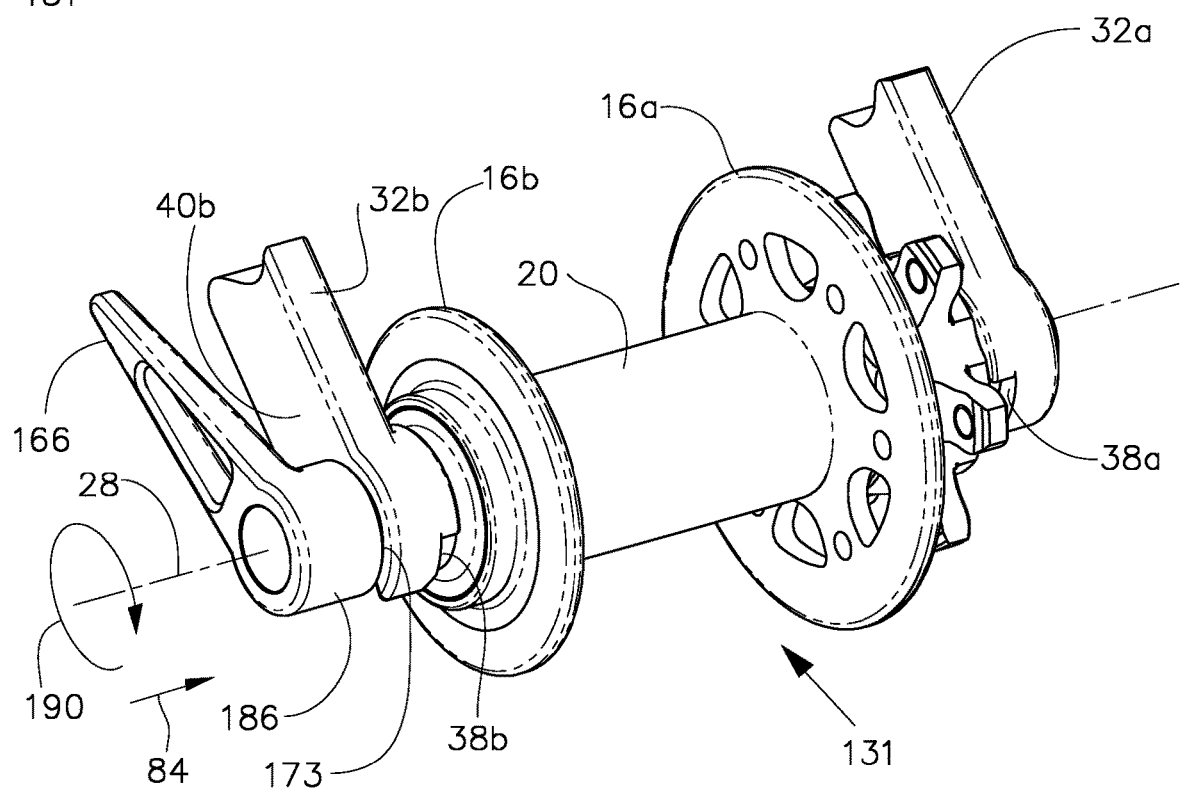
Figure 3G:
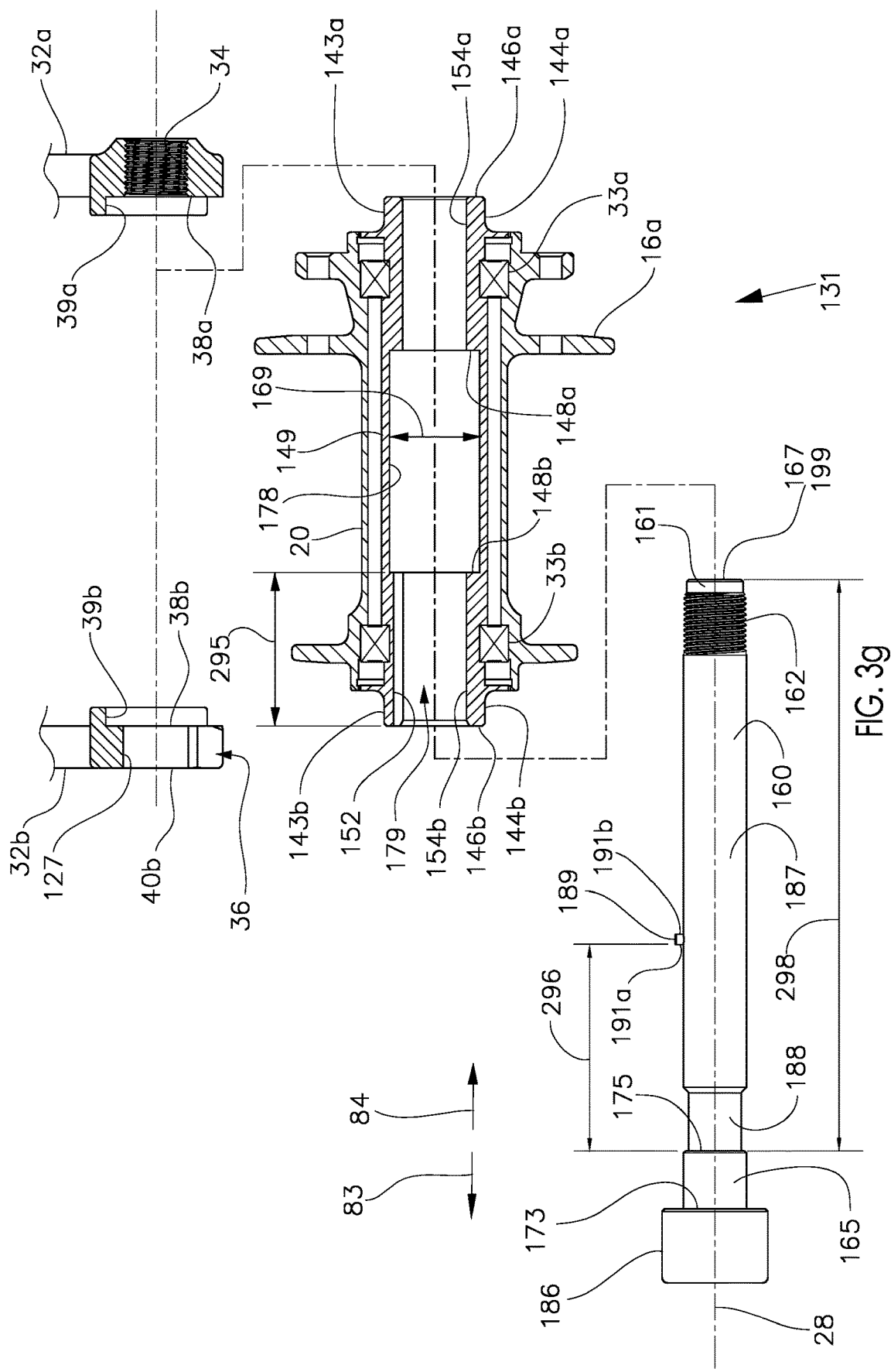
FIG. 3g is an exploded axial cross-section view of the embodiment of FIG. 3a taken along 125-125, corresponding to the assembly sequence of FIG. 3a, showing the dropouts of the bicycle frame and the hub assembly, including a control shaft shown prior to its assembly with the axle sleeve.

The embodiment of FIGS. 3a-L describe is similar to the embodiment of FIGS. 2a-k, however, instead of the helical rib-and-groove escapement, FIGS. 3a-L include a straight axial groove of the sleeve assembly 149 (also considered the "axle sleeve") to provide a vent and escapement relief to a radially projecting peg of the control shaft 160. FIGS. 3a-L describe an embodiment of the present invention with a threaded engagement between a control shaft 160 of a hub assembly 130 and the dropouts 32a and 32b of the frame (not shown). The hub assembly 130 includes the hub 131 and the control shaft 160. In this embodiment, the frame includes an open-slotted dropout 32b axially opposed to this threaded engagement, for quick and easy wheel removal. FIGS. 3a and 3g are exploded views, showing the control shaft 160 prior to assembly with the sleeve assembly 149 and with the hub 131 prior to its assembly with the dropouts 32a and 32b.

Referring to FIGS. 3a and 3g, dropouts 32a (left dropout) and 32b (right dropout) are identical to those described in FIGS. 2a-k. The hub 131 includes sleeve assembly 149 and is otherwise identical to the hub 31 of FIGS. 2a-k.

For simplicity of description, the sleeve assembly 149 is shown as a single unitary component, although it is assumed that sleeve assembly 149 may be created as an assembly of multiple individual components, an example of which is shown in FIGS. 2a-k, which is an assembly of sleeve 142 and axlecaps 44a and 44b. Sleeve assembly 149 includes outer faces 146a and 146b, internal shoulders 148a and 148b, cylindrical alignment surfaces 143a and 143b, and axially extending holes 154a and 154b therethrough. Opening 179 extends axially between outer faces 146a and 146b and includes holes 154a and 154b with relieved bore 178 axially positioned therebetween. The diameter of holes 154a and 154b are preferably sized to provide a radially piloting sliding fit with the shank portion 187 of the control shaft 160. The sleeve assembly 149 includes shoulders to provide axial location of the bearings 33a and 33b. The sleeve assembly 149 constitutes a generally cylindrical tubular element that includes an axial opening 179 therethrough with end faces 146a and 146b. The diameter 169 of bore 178 is sized to provide radial clearance for peg 189 and is shown to be larger in diameter than holes 154a and 154b. Opening 179 includes shoulders 148a and 148b at the transitions between bore 178 and holes 154a and 154b respectively. Hole 154b includes groove 152 that extends axially between end face 146b and shoulder 148b. The shoulder 148b is preferably axially located at a prescribed and predetermined axial distance 295 from the outer face 146b.

Hub 131 is assembled as shown to include hub shell 20, sleeve assembly 149, and bearing assemblies 33a and 33b. Control shaft 160 is similar to control shaft 60 and includes a shank portion 187 and an enlarged head portion 186, with a grip face 173 serving as a transition surface between the collar portion 165 and head portion 186. The shank portion 87 extends axially from the grip face 173 to the engagement end 167. Engagement end 167 includes external threads 162, end face 199 and pilot portion 161. Shank portion 187 also includes a cylindrical collar portion 165 of larger diameter and a necked portion 188 that is concentric with collar portion 165 and is of smaller diameter such that there is a step or transition surface 175 therebetween. End face 199 and transition surface 175, which correspond to first and second leading engagement edges of the control shaft 160 respectively, are axially separated by engagement distance 298, which preferably corresponds to the axial distance between the outboard face 40b and the inboard face 38a. The head portion 186 extends axially outwardly from the grip face 173 and includes lever 166 to provide manual tightening torque and leverage when the control shaft 160 is manipulated by the operator in the conventional manner Lever 166 is provided as a representative means to facilitate the manual rotation of the control shaft 160. Shank portion 187 also includes a radially outwardly projecting peg 189 having a surface 191a facing axially toward the grip face 173 and a surface 191b facing axially toward engagement end 167. There is preferably a prescribed axial distance 296 between the surface 191a and transition surface 175. End face 199 and transition surface 175, which correspond to first and second axially leading engagement edges of the control shaft 160 respectively, are axially separated by engagement distance 298, which preferably corresponds to the axial distance between the outboard face 40b and the inboard face 38a. As shown in FIGS. 3a and 3g, the control shaft 160 is completely withdrawn in the retracting direction 83 to be separated from the hub 131. The hub assembly 130 is shown to be positioned to be axially aligned and radially offset from dropouts 32a and 32b.

As shown in FIG. 3b, the control shaft 160 has next been partially inserted into the opening 179 in the extending direction 84 by first passing the engagement end 167 through the hole 154b, then bore 178, and is aligned to be inserted through hole 153b. Since there is radial clearance between the shank portion 187 and the holes 154b and 154a and bore 178, this insertion is free and easy and without appreciable radial binding and/or axial resistance therebetween up to this point.

Figure 3H:
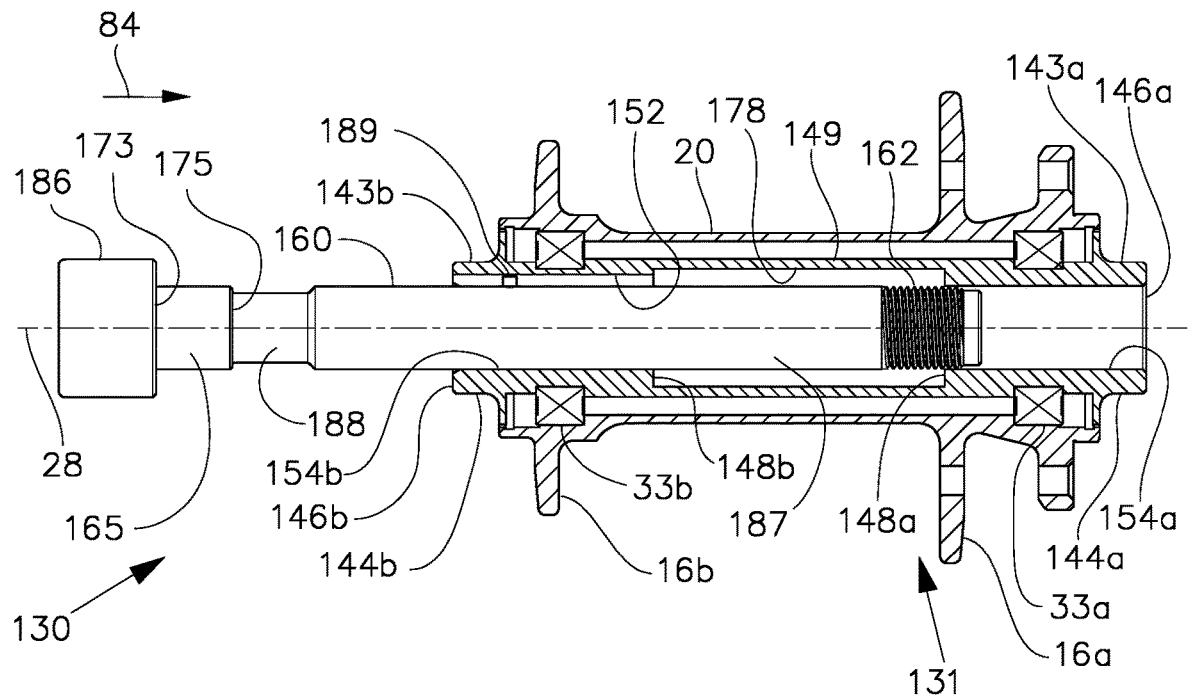
FIGS. 3h-L are cross-section views of the embodiment of FIG. 2a, taken along 125-125, showing the progressive sequence of operations involved in assembling the control shaft and hub assembly with the dropouts of the frame.

Next, the control shaft 160 is further advanced in the extending direction 84 until the surface 191b of peg 189 axially abuts the end face 146b. The control shaft 160 is then rotated in direction 90 relative to sleeve assembly 149 until the peg 189 is circumferentially aligned with groove 152, providing an axial escapement such that peg 189 may pass through groove 152 in direction 84 as shown. This allows the control shaft 160 to further advance in direction 84 until the peg 189 is axially overlapping the groove 152 as shown in FIG. 3h. As is common in escapement engagements, there is a small amount of circumferential clearance between the peg 189 and groove 152 to allow axially overlapping assembly therebetween. It is preferable to minimize this circumferential assembly clearance so as to provide as small a window of circumferential alignment as possible between the peg 189 and groove 152. While any amount of circumferential clearance is envisioned, it may be preferable to keep this clearance below 5 degrees. This is to optimize the retaining feature between the control shaft 160 and the sleeve assembly 149 as described hereinbelow.

Figure 3I:
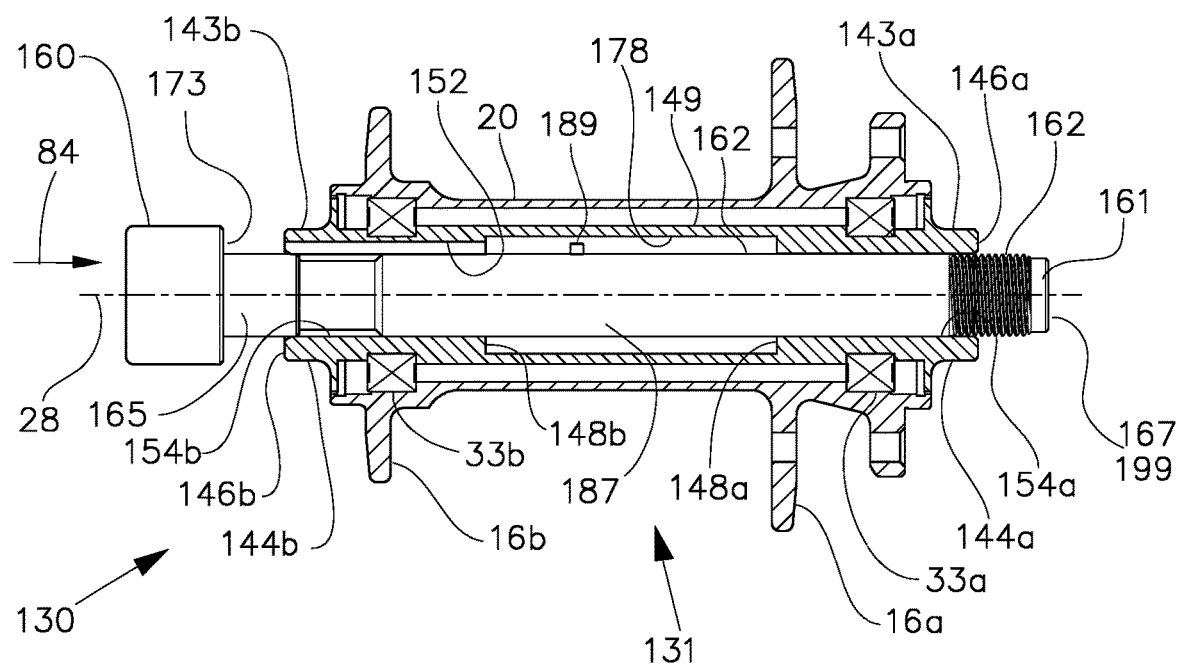

Next, the control shaft 160 is further advanced in direction 84 until the peg 189 is axially inboard of shoulder 148b as shown in FIG. 3i. The control shaft 160 may now be easily slideably axially shuttled and extended further in direction 84 as shown. Since the peg 189 is now no longer circumferentially captured within groove 152, the control shaft may now also be circumferentially rotated relative to the sleeve assembly 149.

It may be considered that peg 189 is a radially outwardly projecting projection that projects from the remainder of the shank portion 187. Peg 189 has an axially inwardly facing surface 191a and an axially outwardly facing surface 191b. These surfaces 191a and 191b extend over a circumferential width 192, while the remainder portion of the shank portion 187 that is axially coincident with the peg 189 may be considered to be a radially relieved surface relative to the peg 189 that extends over a complementary circumferential width to make up the total circumference of the shank portion 187. It may also be considered that the internal surface of hole 154b is a radially inwardly projecting surface that is circumferentially interrupted and staggered from the radially outwardly projecting groove 152. Hole 154b has an axially outwardly facing end face 146b and an axially inwardly facing shoulder 148b. The groove 152 extends over a circumferential width 193, while the axially coincident portion of the hole 154b may be considered to be a radially inboard surface relative to the groove 152 that extends over a complementary circumferential width to make up the total circumference of the hole 154b.

Further, end face 146b and shoulder 148b serve as the axially outboard terminus and axially inboard terminus (respectively) of the hole 64b and groove 152, which are each circumferentially interrupted by the respective entrance of the groove 152. During assembly and disassembly of the control shaft 160 with the sleeve assembly 149, the peg 189 axially and radially overlaps the groove 152. The peg 189 has circumferential and radial clearance with the groove 152 and the hole 154b has radial clearance with the shank portion 187 such that the control shaft 160 may be axially displaced and shuttled relative to the sleeve assembly 149 while the peg 189 is axially overlapping the groove 152. Further, since the shank portion 187 has radial clearance with the hole 154b, the control shaft 160 may be both axially shuttled and circumferentially rotated relative to the sleeve assembly 149 once the peg 189 has advanced axially inwardly from the end face 146b or axially outwardly from shoulder 148b.

Figure 3J:
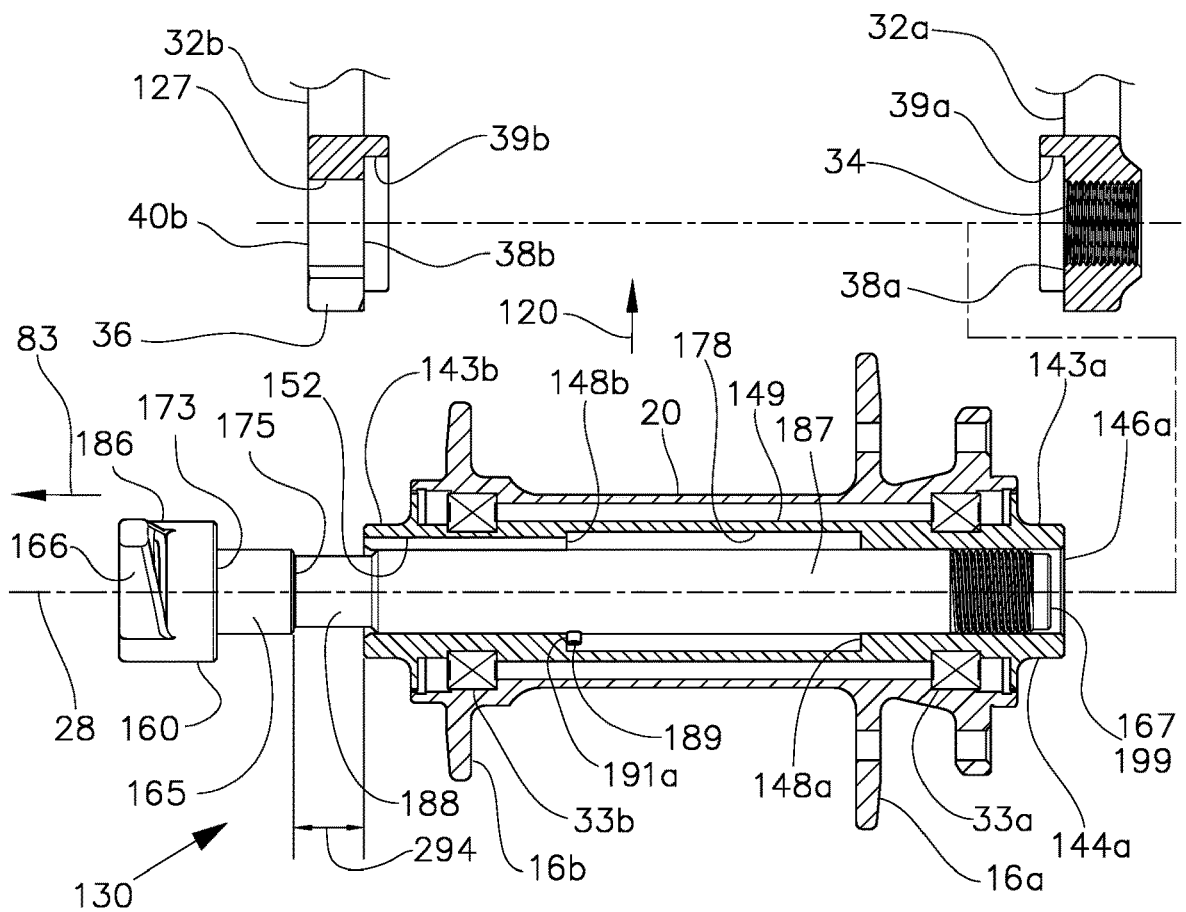

Next, as shown in FIGS. 3d and 3j, the control shaft 160 has been rotated in direction 190 and then axially retracted and shuttled in direction 83 and until surface 191a of peg 189 axially abuts the shoulder 148b and the control shaft 160 is in the axially retracted position relative to the sleeve assembly 149. As long as the control shaft 160 is not rotated into circumferential alignment with groove 152, the axial abutment between peg 189 and shoulder 148b serves as an axial limit stop to control the axial travel of the control shaft 160 with respect to the sleeve assembly 149 (and hub 131) in direction 83. Since distances 295 and 296 are controlled, this axial abutment corresponds to a retracted position of the control shaft 160 where the end face 199 is axially flush or axially inboard of outer face 146a. Correspondingly, this retracted position also corresponds to a controlled axial distance 294 between transition surface 175 and outer face 146b. In this retracted position, the end face 199 is slightly axially inboard and recessed from end face 146a and the necked portion 188 is aligned to be extending axially outboard of end face 146b. The hub assembly 130 is shown to be axially aligned and radially offset from dropouts 32a and 32b in preparation for assembly thereto.

It is understood that it is possible that the control shaft 160 may axially shuttled in direction 83 toward the retracted position while being perfectly oriented such that the peg 189 is circumferentially aligned with the groove 152 such that peg 189 and shoulder 148b will not abut each other. However, it is noted that the likelihood of this perfect circumferential alignment is rare and there will more often be some degree of circumferential overlap between the peg 189 and shoulder 148b so that the radial overlie between the peg 189 and shoulder 148b will provide a relatively reliable travel limit stop of the control shaft 160 in the retracting direction 83. This is the reason why it is preferable to minimize the circumferential clearance between the peg 189 and groove 152.

Figure 3K:
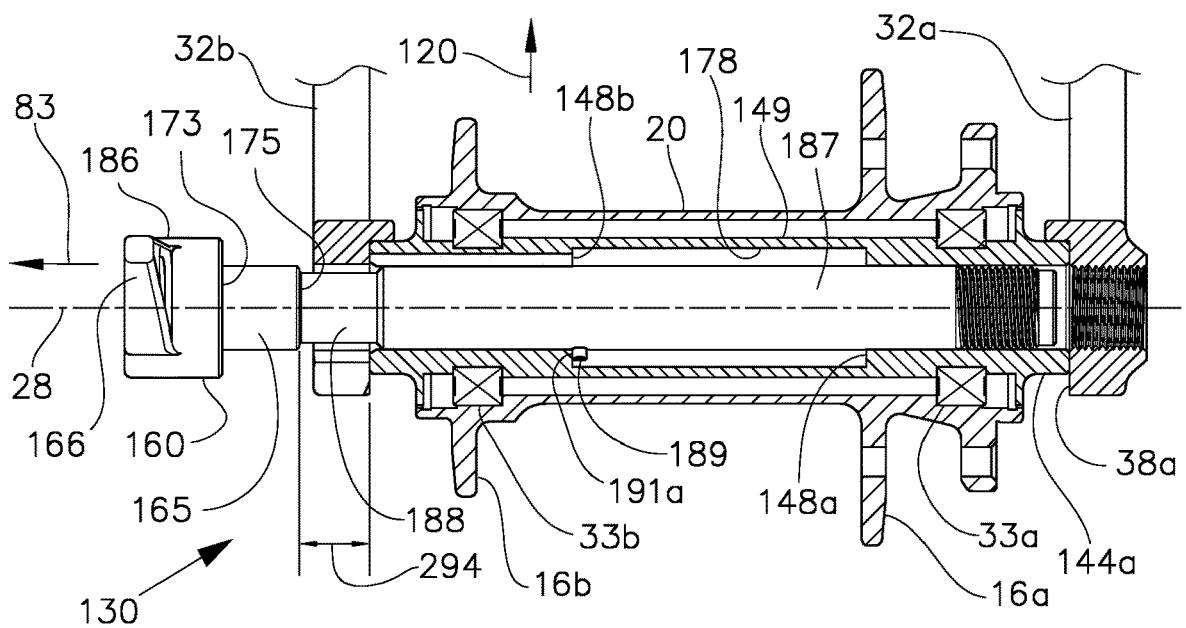

Next, as shown in FIGS. 3e and 3k, the hub assembly 130 is moved in the generally radial direction 120 relative to the dropouts 32a and 32b, with the control shaft 160 still in the retracted position, such that alignment surfaces 143a and 143b are each radially abutting and nested with respective alignment surfaces 39a and 39b to provide radial alignment between the hub assembly 130 and dropouts 32a and 32b. These nested engagements serve to provide a radial positioning depth stop of the hub assembly 130 relative to the dropouts 32a and 32b in the conventional manner Transition surface 175 is axially coincident or preferably slightly axially outboard of outboard face 40b. Necked portion 188 has passed through necked entrance region 126 such that it is now radially centered within pilot region 127. Outer face 146a is axially adjoining end face 38a while outer face 146b is also axially adjoining inboard face 38b to provide axial alignment between the hub assembly 130 and dropouts 32a and 32b. The external threads 162 are now radially aligned with internal threaded hole 34 and collar portion 165 is radially aligned with pilot region 127.

Figure 3L:
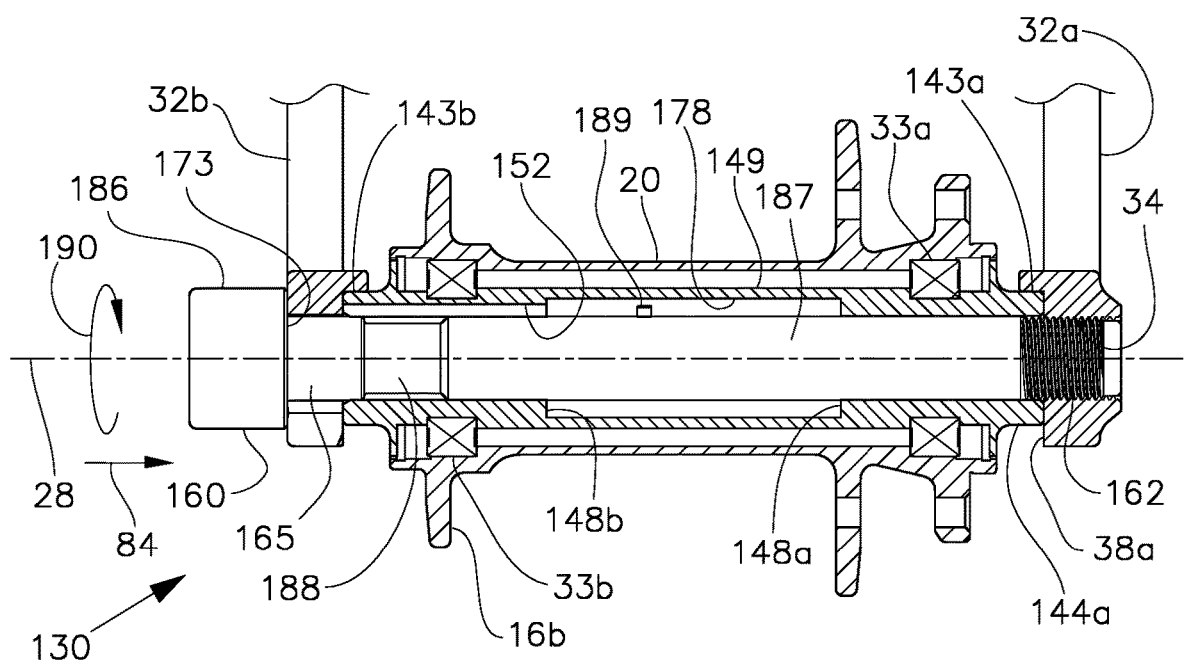

Next, as shown in FIGS. 3f and 3L, the operator has next manually pressed the head portion 186 in the extending direction 84 to linearly displace and shuttle the control shaft 160 in direction 84 (the "extending direction") relative to sleeve assembly 149 to the point that the external threads 162 may now "catch" and be threadably engaged with internal threaded hole 34. The head portion 186 is then also simultaneously manually rotated in direction 190 to threadably engage external threads 162 with internal threaded hole 34 to threadably advance the control shaft 160 further in direction 84 until the grip face 173 axially presses and clamps against outboard face 40b.

Outer face 146a is now axially pressed against inboard face 38a and outer face 146b is also axially pressed against inboard face 38b and the control shaft 160 is in the engaged position. Further threadable tightening of the head portion 186 in direction 190 serves to axially draw outer face 146b toward grip face 173, thereby firmly clamping dropout 32b between grip face 173 and outer face 146b. The sleeve assembly 149 is also axially clamped between inboard faces 38a and 38b. The engagement end 167 is now fully axially overlapping the internal threaded opening 34 and the collar portion 165 is now fully axially overlapping the pilot region 127 to more positively radially retain the hub assembly 130 to the dropouts 32a and 32b. The control shaft 160 is now fully in the "extended position" relative to the sleeve assembly 149 and dropouts 32a and 32b. With the control shaft 160 fully threadably cinched and tightened as described above, it is now in the fully extended position relative to the sleeve assembly 149 and the sleeve assembly 149 (and hub 131) is firmly clamped, installed, and assembled to the dropouts 32a ad 32b.

The procedure for uninstallation and removal of the hub assembly 130 from the dropouts 32a and 32b is basically the reverse of the assembly and installation sequence just described. For removal, the control shaft 160 is first unthreaded from the internally threaded hole 34, in a direction opposite to direction 190, via lever 166, until the external threads 162 are disengaged from the internally threaded hole 34, axially displacing the control shaft 160 in the retracting direction 83.

Once the threaded engagement between the external threads 162 and internal threaded hole 34 is fully unthreaded, the head portion 186 may then be freely linearly retracted and axially withdrawn in the retracting direction 83 until the peg 189 abuts the transition shoulder 148b and the control shaft 160 is in the retracted position as shown in FIGS. 3d and 3j. There is free and easy linear advancement of the control shaft 160 in between the extended and retracted positions and very little retracting force is required by the operator.

Once the control shaft 160 has been displaced in the retracting direction 83 to the retracted position, the axially abutting and radially overlying engagement between peg 189 and shoulder 148b provides a restraint against further advancement in direction 83, which serves to provide a tactile feedback to the operator indicating that the control shaft 160 is again in the axially retracted position as shown in FIGS. 3d and 3k. The retracted position also corresponds to the transition between the free axial displacement of the control shaft 160 and the restrained and/or limited axial displacement of the abutting interface. This restrained and/or limited axial displacement also serves to retain the control shaft 160 with the sleeve assembly 149 to restrain and resist the inadvertent separation between the two.

This tactile feedback lets the operator know that the retracted position has been achieved such that the end face 199 is recessed from outer face 46a and the necked portion 188 is axially aligned with the necked entrance region 126 such that engagement end 167 is no longer axially overlapping the internal threaded hole 34 and collar portion 165 is no longer axially overlapping the pilot region 127. This axially abutting engagement serves to axially restrain and limit the control shaft 160 by providing a radially overlapping overlie engagement with the sleeve assembly 149 to restrain axial displacement therebetween.

The hub assembly 130 may now be radially disassembled and removed from the dropouts 32a and 32b in a direction opposite to direction 120 as shown in FIGS. 3d and 3j. It is noted that the control shaft 160 need not be completely withdrawn in the retracting direction 83 (as shown in FIG. 3a, for example) in order to remove the hub assembly 130 and control shaft 160 from the dropouts 32a and 32b. The hub assembly 130 may later be assembled to the dropouts 32a and 32b in the procedure previously described in FIGS. 3a-L. Thus the tactile feedback provided by the axially abutting engagement serves as an aid to the operator in detecting the retracted position during both the disassembly and assembly procedures with the dropouts 32a and 32b as described hereinabove.

In the case where the operator would like to completely withdraw and remove the control shaft 160 from the sleeve assembly 149, the operator may retract the control shaft 160 to the retracted position and then rotate the control shaft 160 in direction 190 (relative to the sleeve assembly 149) until the peg 189 is circumferentially aligned with groove 152 while also pulling the control shaft 160 in direction 83. The radially overlying engagement between the peg 189 and shoulder 148b no longer exists in this circumferentially aligned position, thus providing an axial escapement where the peg 189 may then pass within groove 152 (as shown in FIG. 3h) in direction 83 to further advance the control shaft 160 in direction 83 until the peg 189 is axially outboard of end face 146b as shown in FIG. 3b. The control shaft 160 may next be further axially shuttled in direction 83 relative the sleeve assembly 149 until the control shaft 160 is fully withdrawn therefrom as shown in FIGS. 3a and 3g.

While my above description contains many specificities, these should not be construed as limitations on the scope of the invention, but rather as exemplifications of embodiments thereof. For example:

The threadable mating between male thread ribs and female thread grooves of internal threads 52 and external threads 62, as well as the mating between male peg 189 and female groove 152 are merely representative of a wide range of possible configurations that may provide an axial escapement between the control shaft and the axle sleeve. This escapement allows the control shaft to be inserted and/or withdrawn from the axle sleeve in a specified circumferential orientation therebetween and allows the control shaft to be retained to the axle sleeve in another circumferential orientation therebetween. The embodiments of FIGS. 2a-k and 3a-L describe two different arrangements to achieve this goal. The male thread ribs and female thread grooves, as well as the male peg 189 and female groove 152 are shown in the figures to be rigid elements that are rigidly fixed to their respective control shaft and/or axle sleeve elements. However, a wide range of alternate arrangements may be substituted, including arrangements where the male or female elements may be radially and/or axially displaceable relative to their respective control shaft and/or axle sleeve elements when these male elements are axially overlapping these female elements.

The male thread ribs and female thread grooves of internal threads 52 and external threads 62, as well as the male peg 189 and female groove 152 are shown to be axially fixed and integral with their respective control shaft and axle sleeve elements. However, it is envisioned that the male and/or female elements may be axially displaceable relative to their respective control shaft and axle sleeve elements. Further, it is envisioned that the male and/or female elements may be in a separate element that is connected to their respective control shaft and axle sleeve elements. For example, the external threads 62 of the control shaft 60 may be in a sleeve element (not shown) that is a separate element connected to the shank portion 87. The sleeve element may be permitted to have a certain amount of axial shift or axial freeplay with respect to the control shaft 60.

It is noted that the threadable mating between male thread ribs and female thread grooves of internal threads 52 and external threads 62 of FIGS. 2a-k describes a helical engagement therebetween that necessitates circumferential rotation and axial displacement therebetween. It is also noted that the male peg 189 and female groove 152 of FIGS. 3a-L describe a linear axial engagement therebetween that restricts circumferential rotation and permits only axial displacement therebetween. It is envisioned that a wide range of alternate configurations may be substituted to provide a wide range of possible alternate relationships between axial and circumferential displacement between the control shaft and the axle sleeve when these male elements are axially overlapping these female elements.

It is noted that the threadable mating between male thread ribs and female thread grooves of internal threads 52 and external threads 62 of FIGS. 2a-k and the peg-and-groove mating between the male peg 189 and female groove 152 provide a circumferential engagement between mating male and female elements over a relatively long axial length of overlap. It is envisioned that a wide range of alternate axial overlap lengths may be substituted, including an axial overlap that is quite short and has very little axial overlap.

It is noted that, in the case of a single lead thread engagement between internal threads 52 and external threads 62 of FIGS. 2a-k, the escapement therebetween can be initiated in only a single circumferential orientation between the control shaft 60 and sleeve assembly 49. However, in the case of a double lead thread engagement between internal threads 52 and external threads 62, the escapement therebetween can be initiated in one of two possible circumferential orientations between the control shaft 60 and sleeve assembly 49. Similarly, the sleeve assembly 140 of FIGS. 3a-L may include multiple circumferentially spaces grooves 152 such that the escapement between the control shaft 160 and sleeve assembly 149 may be initiated in one of a corresponding multiplicity of circumferential orientations between the control shaft 160 and sleeve assembly 149. Thus it is understood that it is envisioned that the present invention may be adapted to an escapement at a multiplicity of such circumferential orientations.

It is noted that there is close circumferential clearance between male thread ribs and female thread grooves of internal threads 52 and external threads 62 of FIGS. 2a-k and between the male peg 189 and female groove 152 of FIGS. 3a-L when these male elements are axially overlapping these female elements. As such, the circumferential orientation between the mating control shaft and axle sleeve is generally closely controlled. Alternatively, it is envisioned that there be a greater circumferential clearance between male thread ribs and female thread grooves of internal threads 52 and external threads 62 of FIGS. 2a-k or between the male peg 189 and female groove 152 of FIGS. 3a-L such that the circumferential orientation between the mating control shaft and axle sleeve is more loosely controlled, permitting a certain degree of circumferential "slop" or free-play between the mating control shaft and axle sleeve when these male elements are axially overlapping these female elements.

It is noted that there is radial and circumferential clearance between male thread ribs and female thread grooves of internal threads 52 and external threads 62 of FIGS. 2a-k and between the male peg 189 and female groove 152 of FIGS. 3a-L. As such, there is relatively free axial displacement between the mating control shaft and axle sleeve when these male elements are axially overlapping these female elements. Alternatively, there may be a degree of radial and circumferential clearance between these male and female elements such that there is resistance (but not absolute restriction) to the axial displacement between the mating control shaft and axle sleeve when these male elements are axially overlapping these female elements.

It is noted that the female thread grooves of internal threads 52 and external threads 62 of FIGS. 2a-k and the female groove 152 of FIGS. 3a-L are generally circumferentially constant and do not vary appreciably along the axial axis 28. However, it is envisioned that these female elements may alternatively be circumferentially variable along the axial axis 28 such that the circumferential engagement between the male thread ribs and female thread grooves of internal threads 52 and external threads 62 of FIGS. 2a-k and between the male peg 189 and female groove 152 of FIGS. 3a-L may vary corresponding to the axial orientation between the mating male and female elements.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel axle assembly, comprising:
an axle sleeve that includes: a first end face; a second end face axially spaced from said first end face; an axially extending opening therethrough; and a radially extending first engagement surface;
a control shaft including: an engagement end; a control end axially opposed said engagement end;
and a radially extending second engagement surface;
wherein said axle sleeve is configured to extend within a hub shell;
wherein said control shaft extends within said opening to be axially overlapping said axle sleeve with said engagement end proximal said first end face and distal said second end face;
wherein said control shaft is axially displaceable relative to said axle sleeve in an extending direction toward said first end face and a retracting direction axially opposed to said extending direction and toward said second end face;
wherein said control shaft is circumferentially rotatable relative to said axle sleeve between: (i) a first circumferential orientation therebetween that corresponds to an engaged orientation wherein said control shaft is axially retained to said axle sleeve by means of an overlie engagement at an engagement interface between said first engagement surface and said second engagement surface to restrict the axial displacement of said control shaft in said retracting direction at a first axial position relative to said axle sleeve; and (ii) a second circumferential orientation therebetween that is circumferentially offset from said first circumferential orientation such that said first engagement surface is not overlying said second engagement surface and said control shaft may be axially displaced in said retracting direction relative to said first axial position.

2. The vehicle wheel axle assembly according to claim 1, wherein at least one of: (i) said control shaft includes a vent with a vent entrance and said axle sleeve includes a projection, wherein said second circumferential orientation corresponds to the circumferential alignment of said vent entrance with said projection, and (ii) said axle sleeve includes a vent with a vent entrance and said control shaft includes a projection, wherein said second circumferential orientation corresponds to the circumferential alignment of said vent entrance with said projection.

3. The vehicle wheel axle assembly according to claim 2, wherein said vent is an axially extending groove with an axially inboard vent entrance axially adjacent said overlie engagement and an axially outboard vent entrance axially opposed to and axially outboard of said axially inboard vent entrance.

4. The vehicle wheel axle assembly according to claim 3, wherein said control shaft may be linearly shuttled relative to said axle sleeve between said retracted position and said fully withdrawn position.

5. The vehicle wheel axle assembly according to claim 2, including circumferential clearance between said vent entrance and said projection to permit axial passage therebetween.

6. The vehicle wheel axle assembly according to claim 5, wherein said circumferential clearance is less than five (5) degrees.

7. The vehicle wheel axle assembly according to claim 1, wherein said control shaft may be axially displaced relative to said axle sleeve:
  (i) in said extending direction to an axially extended position wherein said engagement end projects axially outwardly from said first end face;
  (ii) in said retracting direction to an axially retracted position that corresponds to said engaged orientation wherein said engagement end is axially inward relative to said extended position; and
  (iii) in said retracting direction relative to said retracted position to a partially withdrawn position, wherein said second engagement surface is positioned to be axially beyond said first engagement surface in said retracting direction, with said control shaft in said second circumferential orientation relative to said axle sleeve.

8. The vehicle wheel axle assembly according to claim 7, wherein said control shaft may be axially displaced relative to said axle sleeve in said retracting direction from said partially withdrawn position to a fully withdrawn position such that said control shaft is completely removed and separated from said opening.

9. The vehicle wheel axle assembly according to claim 8, wherein said control shaft must be rotated relative to said axle sleeve about said axial axis such that said control shaft may be axially displaced between said retracted position and said fully withdrawn position.

10. The vehicle wheel axle assembly according to claim 7, wherein said engagement end is axially flush or axially inboard relative to said first end face in said retracted position.

11. The vehicle wheel axle assembly according to claim 7, including free axial displacement of said control shaft between said extended position and said retracted position.

12. The vehicle wheel axle assembly according to claim 7, including a frame, wherein said control shaft is displaced in said extending direction to be radially engaged to said frame in said extended position and is displaced in said retracting direction to be radially disengaged from said frame in said retracted position, wherein said frame element includes a first frame member for connection with said engagement end and a second frame member for connection with said control end, wherein said second frame member includes an open slot, with an open entrance portion, to radially receive said control shaft.

13. The vehicle wheel axle assembly according to claim 1, wherein at least one of:
  (i) said first engagement surface is an axially inwardly projecting first thread end transition of a helical internal thread rib, and including a helical internal thread groove circumferentially adjacent said internal thread rib; and
  (ii) said second engagement surface is an axially outwardly projecting second thread end transition of a helical external thread rib, including a helical external thread groove circumferentially adjacent said internal thread rib.

14. The vehicle wheel axle assembly according to claim 13, wherein said first thread end transition is the thread end transition of said internal thread rib proximal to said first end face and said second thread end transition is the thread end transition of said external thread rib proximal to said control end.

15. The vehicle wheel axle assembly according to claim 1, wherein said engaged orientation is maintained within a circumferential displacement range between said control shaft and said axle sleeve of at least 180 degrees.

16. The vehicle wheel axle assembly according to claim 1, wherein at least one of said first engagement surface and said second engagement surface extends circumferentially about said axial axis by at least 270 degrees.

17. The vehicle wheel axle assembly according to claim 1, wherein at least one of: (i) said first engagement surface is a radially fixed surface that is not radially displaceable relative to said axle sleeve; and (ii) said second engagement surface is a radially fixed surface that is not radially displaceable relative to said control shaft.

18. The vehicle wheel axle assembly according to claim 1, including a generally fixed axial distance between said first engagement surface and said first end face.

19. The vehicle wheel axle assembly according to claim 1, wherein said control shaft includes a grip face adjacent said control end, including a generally fixed axial distance between said second engagement surface and said grip face.

20. The vehicle wheel axle assembly according to claim 1, wherein said first engagement surface is axially positioned between said first end face and said second end face.

21. The vehicle wheel axle assembly according to claim 1, wherein said opening includes a first opening portion axially proximal said first end face and a second opening portion axially distal said first end face, wherein said second opening portion is radially outward of said first opening portion, and wherein said first engagement surface is in the transition between said second opening portion and said first opening portion.

* * * * *